(12) United States Patent
Vratimos et al.

(10) Patent No.: US 12,443,770 B2
(45) Date of Patent: Oct. 14, 2025

(54) SOLAR PANEL SYSTEM GENERATION

(71) Applicant: Unirac, Inc., Albuquerque, NM (US)

(72) Inventors: Miltos Vratimos, San Jose, CA (US); Christos Voutsaras, San Jose, CA (US); Crystal Rochlitz, San Jose, CA (US)

(73) Assignee: Unirac, Inc., Albuquerque, NM (US)

( * ) Notice: Subject to any disclaimer, the term of this patent is extended or adjusted under 35 U.S.C. 154(b) by 589 days.

(21) Appl. No.: 17/183,364

(22) Filed: Feb. 24, 2021

(65) Prior Publication Data

US 2021/0264071 A1 Aug. 26, 2021

Related U.S. Application Data

(60) Provisional application No. 62/980,862, filed on Feb. 24, 2020.

(51) Int. Cl.
*G06F 30/13* (2020.01)
*G06Q 30/0601* (2023.01)
*H02S 20/25* (2014.01)
*G06F 113/04* (2020.01)

(52) U.S. Cl.
CPC ......... *G06F 30/13* (2020.01); *G06Q 30/0623* (2013.01); *H02S 20/25* (2014.12); *G06F 2113/04* (2020.01)

(58) Field of Classification Search
CPC ...... G06F 30/13; G06F 2113/04; H02S 20/25; G06Q 30/0623
See application file for complete search history.

(56) References Cited

U.S. PATENT DOCUMENTS

| | | | |
|---|---|---|---|
| 10,754,999 B1 | 8/2020 | Vratimos et al. | |
| 2014/0025343 A1* | 1/2014 | Gregg | G06F 30/13 703/1 |
| 2016/0063413 A1* | 3/2016 | Yahfoufi | H02S 99/00 705/7.23 |
| 2018/0135983 A1* | 5/2018 | Sadka | G06V 20/176 |
| 2018/0165382 A1* | 6/2018 | Williamson | H02S 20/23 |
| 2018/0239841 A1* | 8/2018 | Wachman | G06F 30/13 |

* cited by examiner

*Primary Examiner* — Kibrom K Gebresilassie
(74) *Attorney, Agent, or Firm* — Knobbe, Martens, Olson & Bear, LLP

(57) ABSTRACT

A solar panel system proposal system includes a remote device configured to display various steps of the solar panel system proposal process and receive input from a user. The user input received from the user allows the user, via the solar panel system proposal system, to create one or more solar panel system layout designs, compare savings for different solar panel system layout designs, select a solar panel system layout design from the one or more solar panel system layout designs, and generate a solar panel system proposal based on the selected solar panel system layout design.

20 Claims, 31 Drawing Sheets

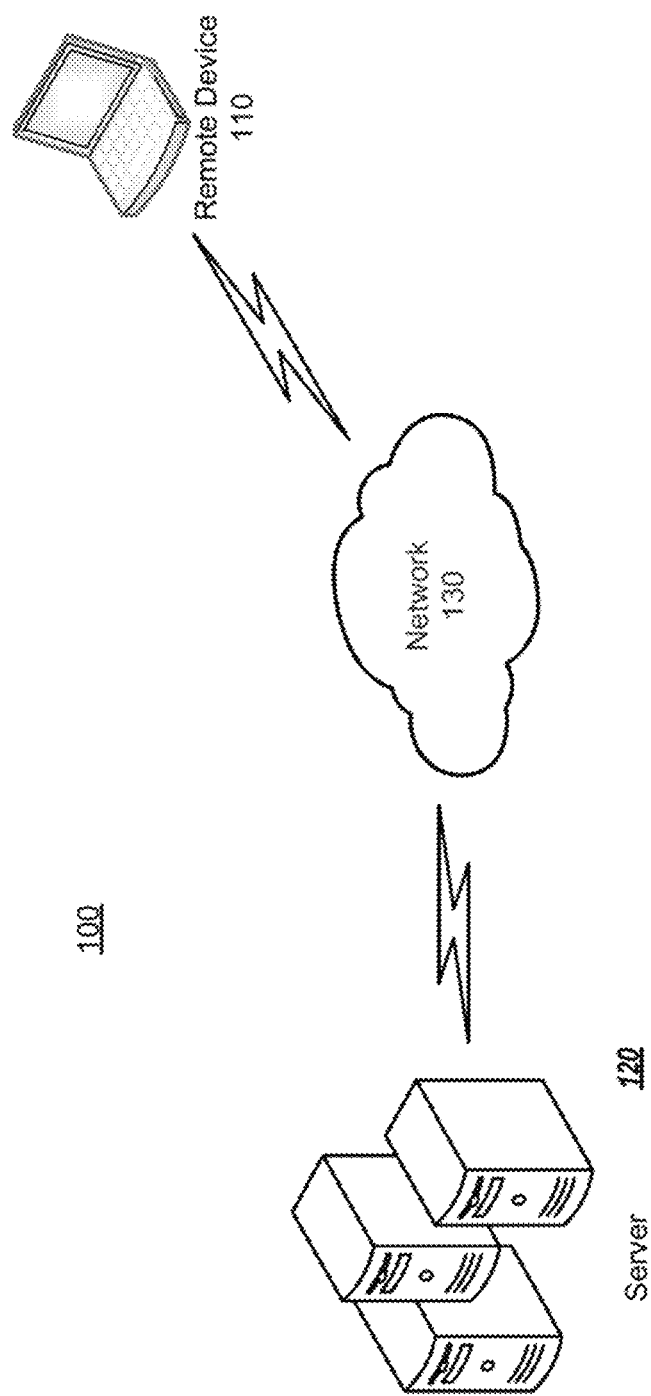

SOLAR PANEL SYSTEM GENERATION

CROSS-REFERENCE TO RELATED APPLICATION

This application claims the benefit of U.S. Provisional Application No. 62/980,862, filed Feb. 24, 2020, which is incorporated herein by reference in its entirety. Additionally, this application is related to U.S. Pat. No. 10,754,999 issued on Aug. 25, 2020, which is incorporated herein by reference in its entirety.

BACKGROUND

Conventionally, a solar panel system proposal is created with significant manual input. These complications are magnified with larger solar panel system designs, such as commercial-scale solar panel systems intended for commercial buildings. As a result, the conventional solar sales process can be a very time consuming and manual process. When a solar dealer prepares a conventional solar proposal for a customer, it is not uncommon to spend days or even weeks preparing it.

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

SUMMARY

According to aspects of the disclosed subject matter, a solar panel system proposal system includes a remote device configured to display various steps of the solar panel system proposal process and receive input from a user. The user input received from the user allows the user, via the solar panel system proposal system, to create one or more solar panel system layout designs, compare savings for different solar panel system layout designs, select a solar panel system layout design from the one or more solar panel system layout designs, and generate a solar panel system proposal based on the selected solar panel system layout design.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 1A illustrates an exemplary solar panel system proposal system according to one or more aspects of the disclosed subject matter;

DETAILED DESCRIPTION

Figure 1B:
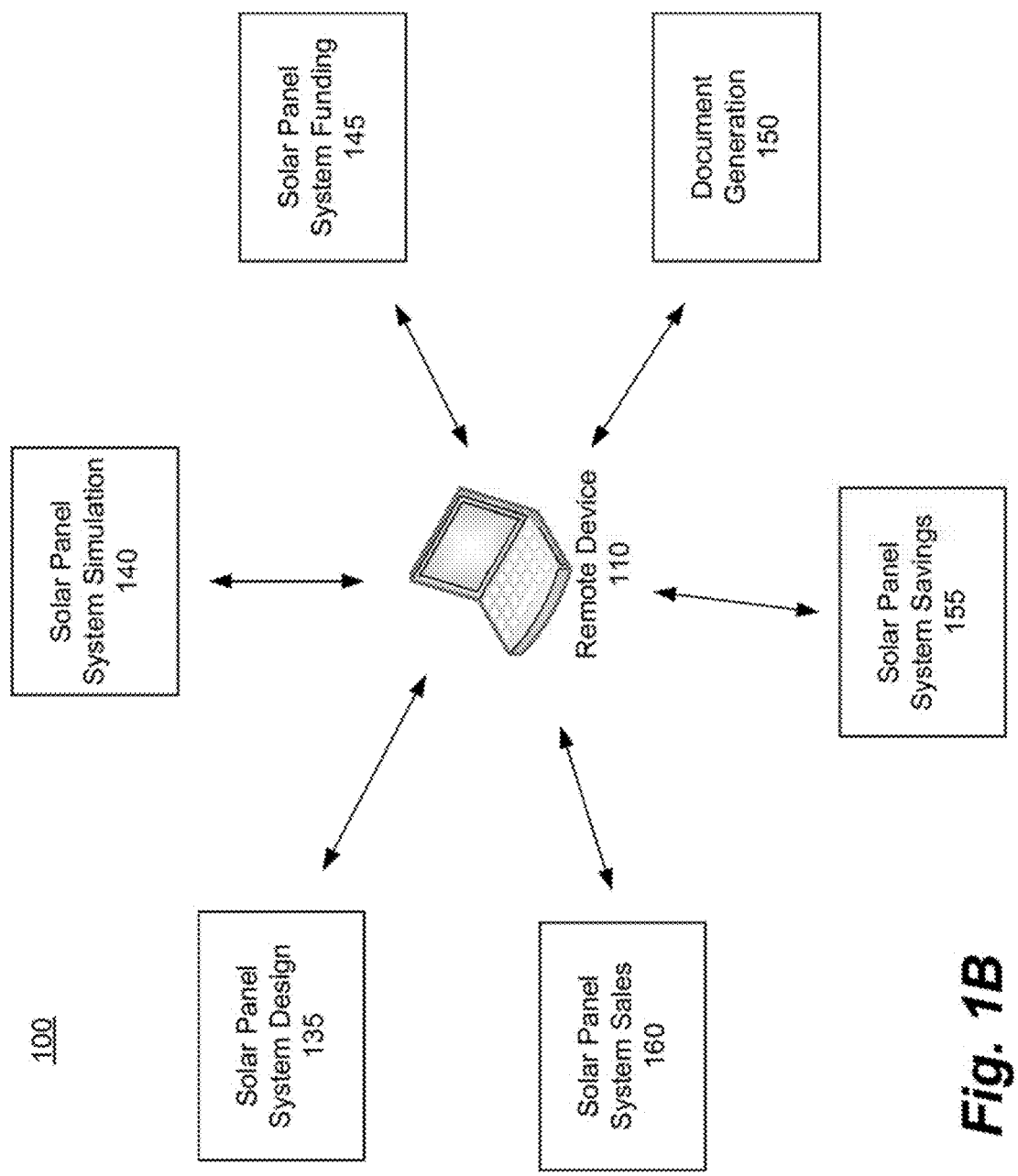
FIG. 1B illustrates the exemplary solar panel system proposal system of FIG. 1A according to one or more aspects of the disclosed subject matter.

The description set forth below in connection with the appended drawings is intended as a description of various embodiments of the disclosed subject matter and is not necessarily intended to represent the only embodiment(s). In certain instances, the description includes specific details for the purpose of providing an understanding of the disclosed subject matter. However, it will be apparent to those skilled in the art that embodiments may be practiced without these specific details. In some instances, well-known structures and components may be shown in block diagram form in order to avoid obscuring the concepts of the disclosed subject matter.

Reference throughout the specification to "one embodiment" or "an embodiment" means that a particular feature, structure, characteristic, operation, or function described in connection with an embodiment is included in at least one embodiment of the disclosed subject matter. Thus, any appearance of the phrases "in one embodiment" or "in an embodiment" in the specification is not necessarily referring to the same embodiment. Further, the particular features, structures, characteristics, operations, or functions may be combined in any suitable manner in one or more embodiments. Further, it is intended that embodiments of the disclosed subject matter can and do cover modifications and variations of the described embodiments.

It must be noted that, as used in the specification and the appended claims, the singular forms "a," "an," and "the" include plural referents unless the context clearly dictates otherwise. That is, unless clearly specified otherwise, as used herein the words "a" and "an" and the like carry the meaning of "one or more." Additionally, it is to be understood that terms such as "left," "right," "top," "bottom," "front," "rear," "side," "height," "length," "width," "upper," "lower," "interior," "exterior," "inner," "outer," and the like that may be used herein, merely describe points of reference and do not necessarily limit embodiments of the disclosed subject matter to any particular orientation or configuration. Furthermore, terms such as "first," "second," "third," etc., merely identify one of a number of portions, components, points of reference, operations and/or functions as described herein, and likewise do not necessarily limit embodiments of the disclosed subject matter to any particular configuration or orientation.

Referring now to the drawings, wherein like reference numerals designate identical or corresponding parts throughout the several views:

The solar sales process (e.g. commercial solar sales, residential solar sales, community or utility-scale solar developments etc.) is a very time consuming and manual process. Typically, when a solar dealer prepares a solar proposal for a customer, it is not uncommon to spend days or even weeks preparing it. The process can include analyzing the solar customer's (e.g. commercial property's) electric bill, designing different versions of the solar system, picking the right finance option for the customer, optimizing customer energy savings and project economics, and finally preparing a solar proposal to be presented to the customer. Since this process is so time consuming, it is limiting the growth of solar adoption, and it is particularly limiting the growth of commercial solar. In order to accelerate the growth of commercial solar, a much more streamlined and automated process is desired.

Traditionally, the commercial solar sales proposal process is a very manual and time-consuming process for a solar dealer. Typically, the process starts by gathering some information about the customer's property (e.g. commercial property), determining a solar design, and estimating solar production for the site. If the solar dealer wants to optimize the design, they have to run several permutations of the design with different solar panels (e.g. having different efficiencies and/or sizes) and different solar mounting or racking configurations (e.g. horizontal, single tilt, dual tilt, carport etc.). Each design takes at least two-three hours and it is not uncommon to run several different iterations. Having established a solar design, the solar dealer then analyzes different financing options trying to optimize customer savings and project economics. Finally, in the last step, the solar dealer aggregates all of this information in one place and generates a customer-facing solar proposal. It is not uncommon for the solar sales proposal to take days and sometimes weeks, especially if the solar dealer wants to fully customize the proposal to the customer's property. Accordingly, because of this disjointed ecosystem, a user (e.g., solar dealer) has to work across different applications, manually move information from one system to another, and if they want to incrementally improve or iterate on a solar proposal, they have to go through all the repetitive steps again. This manual, disjointed, cumbersome process has been a hindrance on the growth of solar sales and, in particular commercial solar sales. As a result, the commercial solar space is in a significant need for a streamlined, one-stop-shop solar panel system proposal application.

FIG. 1A illustrates an exemplary solar panel system proposal system 100 (herein referred to as system 100)

according to one or more aspects of the disclosed subject matter. The system 100 can include a remote device 110, a server 120, and a network 130.

The remote device 110 can represent one or more remote devices communicably coupled to the server 120 via the network 130. The remote device 110 can be a computer, laptop, smartphone, tablet, PDA, and the like. In one aspect, the remote device 110 can be configured to execute a solar panel system proposal software application as further described herein. For example, the remote device 110 can be operated by a user to interact with the system 100 as further described herein. For example, a salesperson, a dealer, a client, or a current and/or future customer can use the remote device 110 to interact with the system 100 to generate a solar panel system proposal as further described herein. More specifically, the remote device 110 can be configured to display one or more user interfaces via the solar panel system proposal software application as further described herein. Each of the one or more user interfaces can be configured to display information corresponding to a specific step in the solar panel system proposal process and/or receive various user input. Further, the user interface can be configured to trigger execution of one or more specific tasks in the solar panel system design proposal process by executing software instructions in response to user input, for example. Additionally, it should be appreciated that each of the one or more user interfaces (e.g., user interfaces 205-2405 in FIGS. 2-24) can be part of the same software application for solar panel system proposals.

The server 120 can represent one or more servers communicably coupled to the remote device 110 via the network 130. The server 120 can be configured to perform various processing for the system 100 as further described herein. For example, as illustrated in FIG. 1B, the one or more servers 120 can correspond to solar panel system design 135, solar panel system simulation 140, solar panel system funding 145, document generation 150, solar panel system savings 155, and solar panel system sales 160. In other words, the server 120 can provide storage and/or processing for various aspects of the system 100 via communications received from the remote device 110. Additionally, the server 120 can represent a dedicated bank of servers, cloud-based processing, and/or a serverless computing system corresponding to a virtualized set of hardware resources. In one aspect, one or more processors and/or processing circuitry in the remote device 110 can be configured to perform one or more of the tasks executed by the servers 120.

The network 130 can be a public network, such as the Internet, or a private network, such as an LAN or WAN network, or any combination thereof and can also include PSTN or ISDN sub-networks. The network 130 can also be wired, such as an Ethernet network, or can be wireless such as a cellular network including EDGE, 3G, 4G, and 5G wireless cellular systems. The wireless network can also be Wi-Fi, Bluetooth, or any other wireless form of communication that is known. The network 130 may also be a proprietary network, a secure public Internet, a virtual private network or some other type of network, such as dedicated access lines, plain ordinary telephone lines, satellite links, combinations of these, etc.

Generally, the system 100 can streamline solar panel system proposals from a multi-day effort to minutes. For example, the system 100 allows a user to design a solar panel system leveraging a solar panel system layout design tool in under one minute, visualize and edit this design, pick the right financing for the project, optimize the design and financing selection process, calculate the customer and project economics, and generate a proposal. The system 100 includes a software application (e.g., via the remote device 110) that combines all the elements of a solar sales proposal (e.g. commercial) in one place, saving the user time and allowing the user to run scenario analysis in a couple of minutes.

More specifically, the system 100 can be configured to allow the user to create a solar panel system proposal in an all-in-one software application. For example, the user can interact with the software application via an electronic device (e.g., remote device 110). The remote device 110 can be configured to receive basic information from the user (e.g., input via a user interface) including information about the project and the customer's electric bill. A user can then either select to create a design using a solar panel system design layout tool or select that a production estimate be provided for a carport or a rooftop system. If the user selects to the use the solar panel system layout design tool, then the user can select the parts of the roof they want for the design. After the design is generated, the user can edit the solar panels and/or select different mounting and module configurations, for example. Additionally, the user has an option to combine different designs, calculate savings for different finance options and different project prices, account for operations and maintenance costs, and the like, as further described herein. Once the user selects a design and finance option, the user can view and download a solar panel system proposal. Accordingly, the system 100 has several advantages including enabling the growth of commercial solar panel systems by making it easy for dealers to quickly generate proposals with an all-in-one tool.

It should be appreciated that "automatically" and/or "real time" in reference to aspects performed by the system 100 are used herein to emphasize features of this disclosure, where conventional computer-implemented tasks that previously relied on substantial user input, direction, and manipulation, by virtue of the teachings of this disclosure, can be decided and implemented by processing circuitry. Consequently, a full-scale (e.g. commercial-scale) solar panel system proposal can be generated in minutes rather than days or weeks. Further, one or more aspects of the solar panel system proposal process described herein can be performed automatically and/or in real time.

Figure 2:
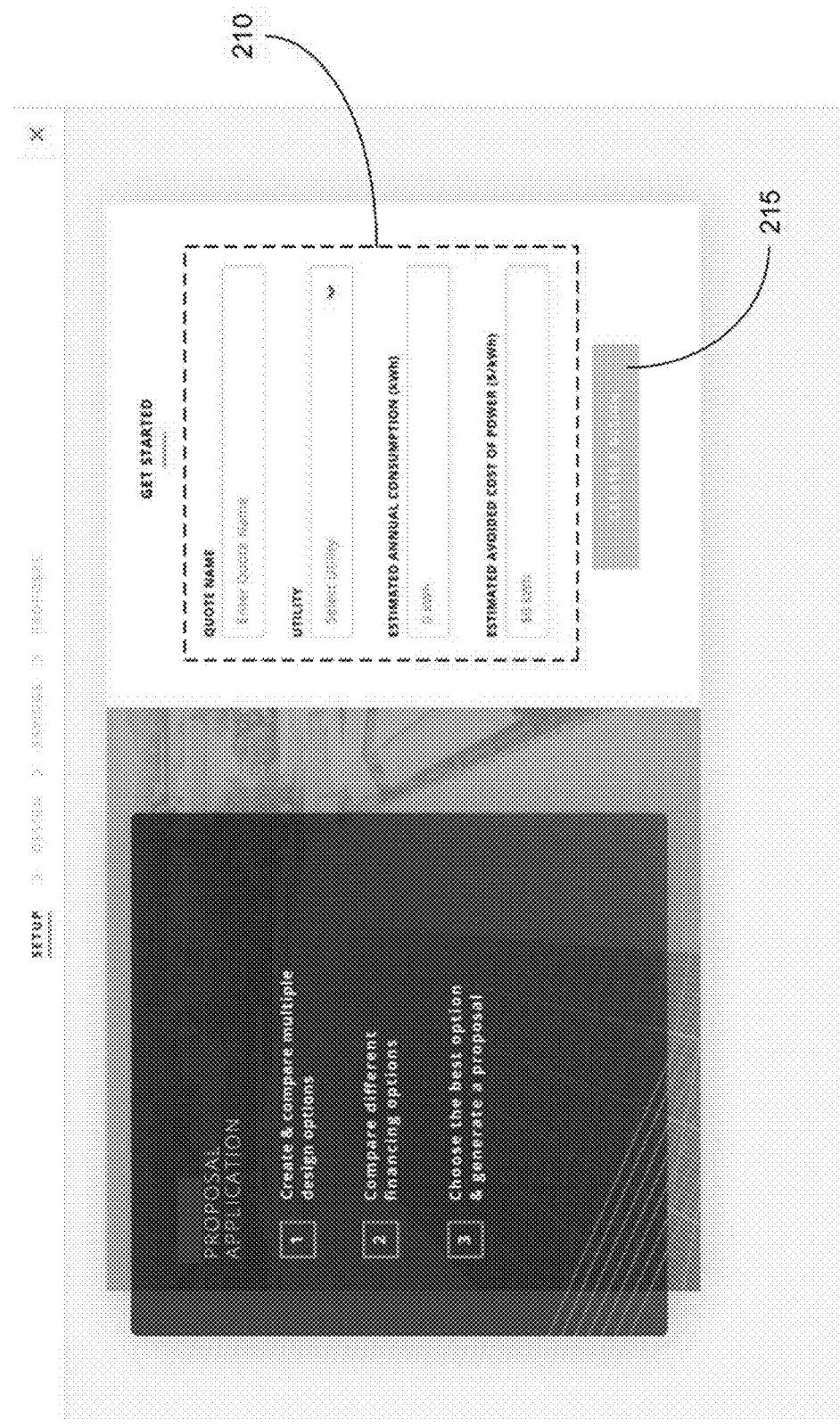
FIG. 2 illustrates an exemplary user interface for a setup page according to one or more aspects of the disclosed subject matter.

FIG. 2 illustrates an exemplary user interface 205 for a setup page according to one or more aspects of the disclosed subject matter. The user interface 205, as with each user interface described herein, can be displayed via the remote device 110, for example. Additionally, the user interface 205, as with one or more other user interfaces further described herein, can be configured to receive input from a user as further described herein. It should also be appreciated that reference to page, interface, and user interface can be interchangeable. Referring to FIG. 2, the user interface 205 can be a setup page. The setup page can introduce the solar panel system proposal application and request various information (e.g., basic information 210) from a user to start the solar panel system proposal process. For example, the user interface 205 for the setup page can be configured to receive basic information 210 including a name for the project (e.g., "Quote Name"), a utility selection (e.g., "Utility"), utility rate, an estimated annual consumption, an estimated avoided cost of power, and the like. After receiving the user input, a button 215 (e.g., "Create A Design") can be selected by the user to continue to the next step of the solar panel system proposal process.

Figure 3:
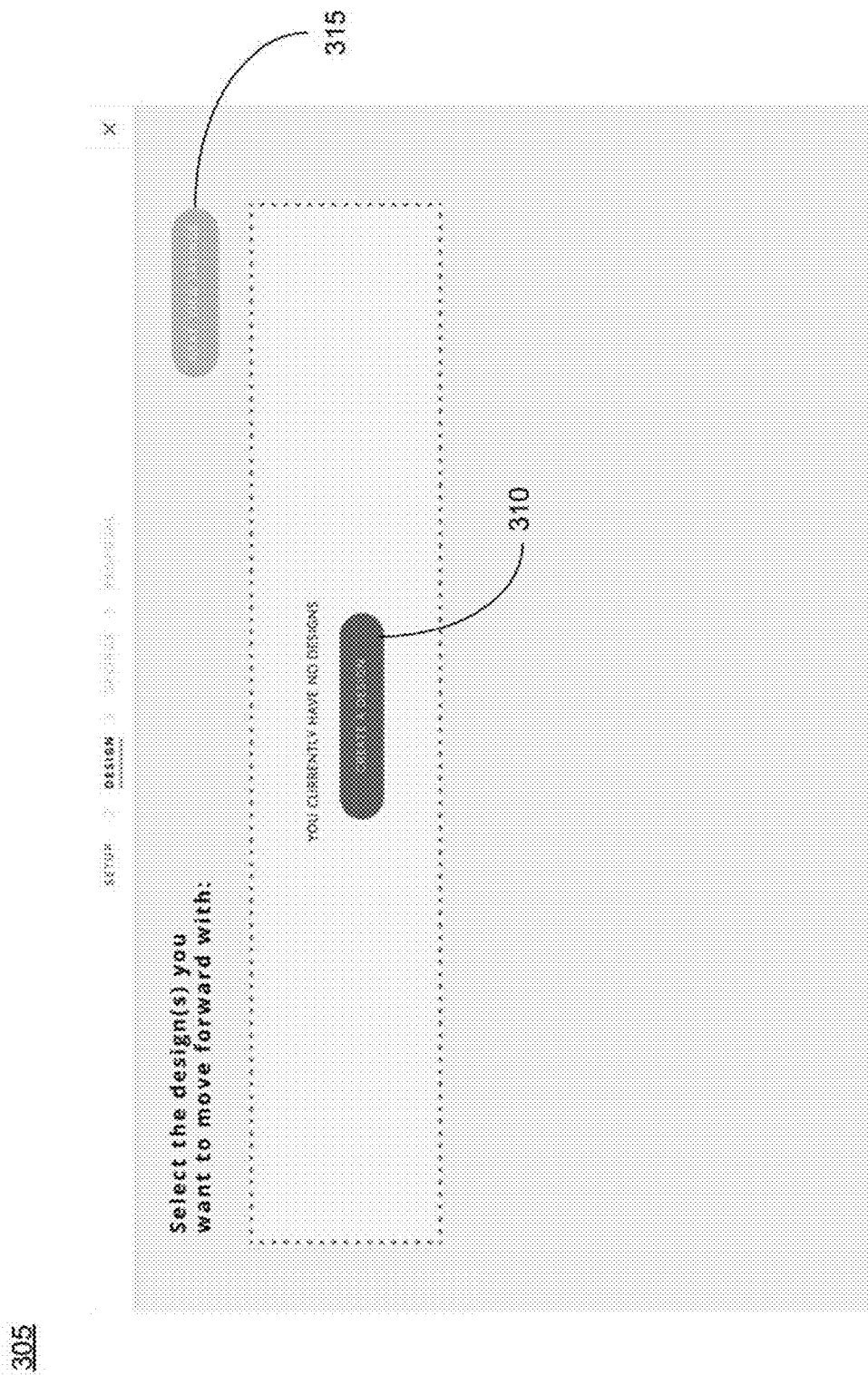
FIG. 3 illustrates an exemplary user interface for a page for selecting and/or creating designs according to one or more aspects of the disclosed subject matter.

FIG. 3 illustrates an exemplary user interface 305 for a page for selecting and/or creating designs according to one or more aspects of the disclosed subject matter. For example, if the user does not have existing designs (e.g., because one has not been created yet), the user can select a button 310 to create a design. If one or more designs have already been created and are displayed for selection, the user can select a button 315 to continue to the next step of the solar panel system proposal process.

Figure 4:
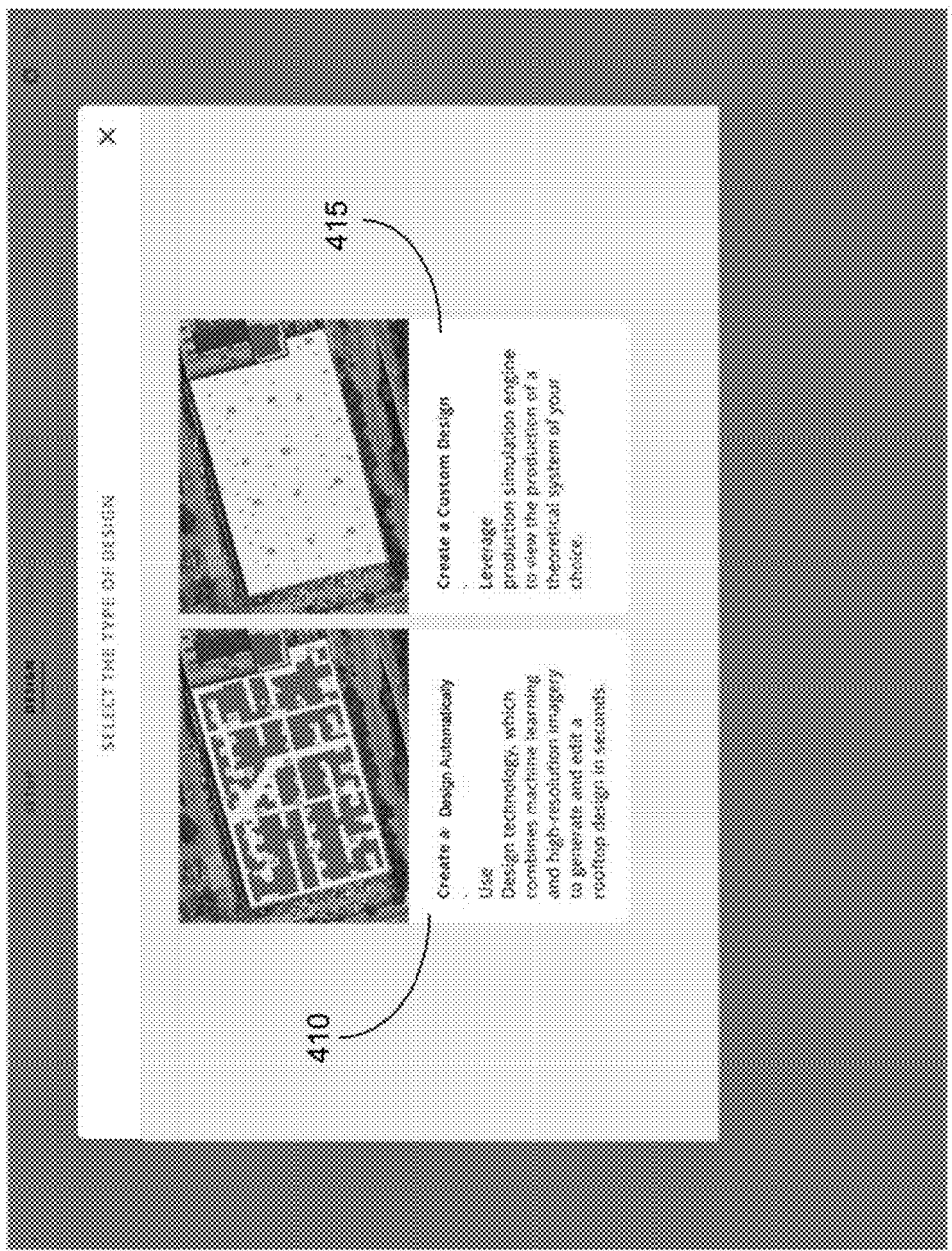
FIG. 4 illustrates an exemplary user interface for a page for selecting a type of solar panel system design according to one or more aspects of the disclosed subject matter.

FIG. 4 illustrates an exemplary user interface 405 for a page for selecting a type of solar panel system design according to one or more aspects of the disclosed subject matter. For example, the user can select a type of design to add to their designs in the user interface 305. More specifically, the user can select a button 410 to create a design using a solar panel system layout design tool. In one aspect, the solar panel system layout design tool can correspond to solar panel system design 135 in FIG. 1B. In other words, when the user selects button 410, the remote device 110 can request a solar panel system layout design from a server corresponding to the solar panel system design 135. In one aspect, the solar panel system layout design tool can automatically generate a solar design in real time based on the received information, and display the solar design to a user. The user can interact with the solar design in various ways to accommodate, implement and calculate various design changes and/or design rules. For example, the solar panel system layout design tool can be SunPower's Instant Design, which is described in more detail in U.S. Pat. No. 10,754,999 issued on Aug. 25, 2020, which is incorporated herein by reference in its entirety, which can generate the solar panel system layout design automatically. Alternatively, the user can select a button 415 to create a custom solar panel system layout design which can leverage a production simulation engine (e.g., solar panel system simulation 140) to view the production of a theoretical system of the user's choosing.

Figure 5:
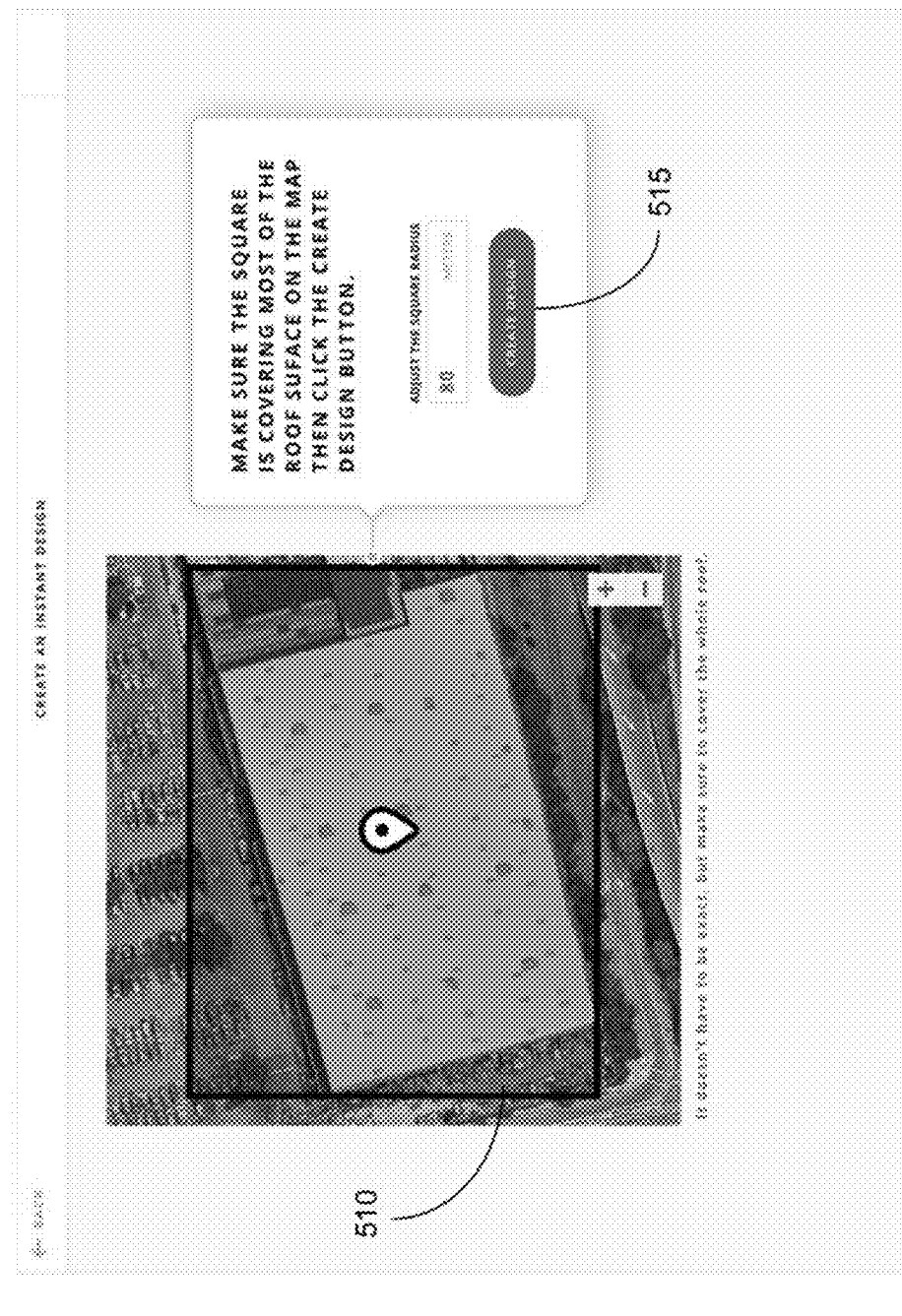
FIG. 5 illustrates an exemplary user interface for a page for create a design using a solar panel system layout design tool according to one or more aspects of the disclosed subject matter.

FIG. 5 illustrates an exemplary user interface 505 for a page for creating a design using a solar panel system layout design tool according to one or more aspects of the disclosed subject matter. For example, the user can adjust a radius of a square 510 so that the square 510 is covering a roof of a building that the solar panel system layout design is being created for. After adjusting the radius of the square 510 to cover the roof, the user can select a button 515 to create the solar panel system layout design automatically and continue to the next step of the solar panel system proposal process.

Figure 6:
FIG. 6 illustrates an exemplary user interface for displaying a design created automatically using the solar panel system layout design tool according to one or more aspects of the disclosed subject matter.

FIG. 6 illustrates an exemplary user interface 605 for displaying a design created automatically using the solar panel system layout design tool according to one or more aspects of the disclosed subject matter. For example, the user can view associated equipment, system size, and production data. In one aspect, the user can select a button 625 to save the design and continue to the next step of the solar panel system proposal process. Additionally, the user can edit the equipment used in the design by selecting one or more equipment buttons 610, 615, and 620. By selecting one of the equipment buttons 610, 615, 620, the user can edit the equipment used in the design in a user interface 705 in FIG. 7.

Figure 7:
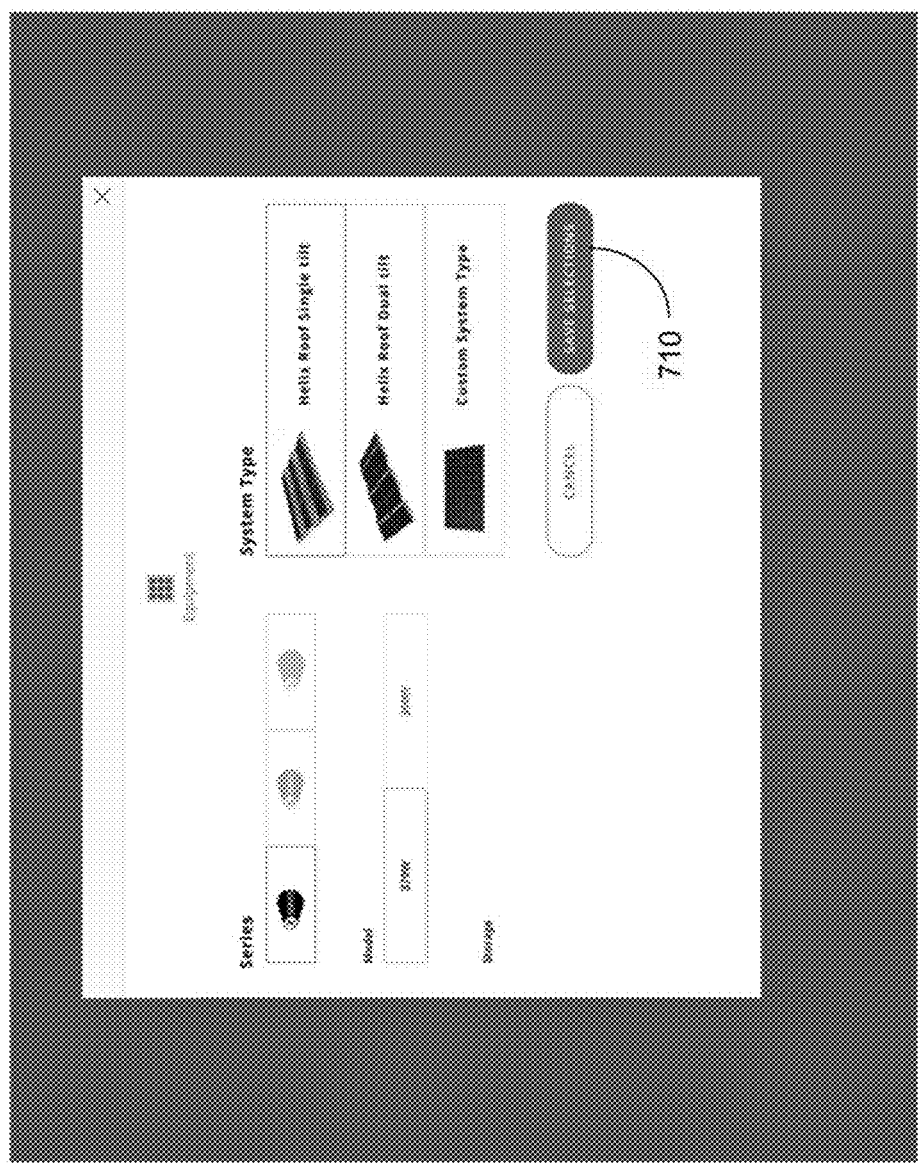
FIG. 7 illustrates an exemplary user interface for editing equipment used in the solar panel system layout design according to one or more aspects of the disclosed subject matter.

FIG. 7 illustrates an exemplary user interface 705 for editing equipment used in the solar panel system layout design according to one or more aspects of the disclosed subject matter. For example, the user can edit the equipment used in the design including the module type series, model, storage type, system type (e.g., solar module wattage, energy storage size, single tilt, dual tilt, custom, etc.), and the like. After selecting the equipment, the user can select a button 710 to save the selections which allows the user to view updated system production data (e.g., via the user interface 605 in FIG. 6).

Figure 8:
FIG. 8 illustrates an exemplary user interface for enabling and/or disabling solar panels used in the solar panel system layout design according to one or more aspects of the disclosed subject matter.

FIG. 8 illustrates an exemplary user interface 805 for enabling and/or disabling solar panels used in the solar panel system layout design according to one or more aspects of the disclosed subject matter. For example, the user can click and drag on an image 815 of the solar panel system layout design to create a box 810 to add or remove (i.e., enable/disable) solar panels used in the solar panel system layout design. Accordingly, adding or removing solar panels from the solar panel system layout design can update the estimated energy offset 820 in real time. After enabling/disabling the desired solar panels, the user can select a button 825 to save the solar panel system layout design and continue to the next step of the solar panel system proposal process.

Figure 9:
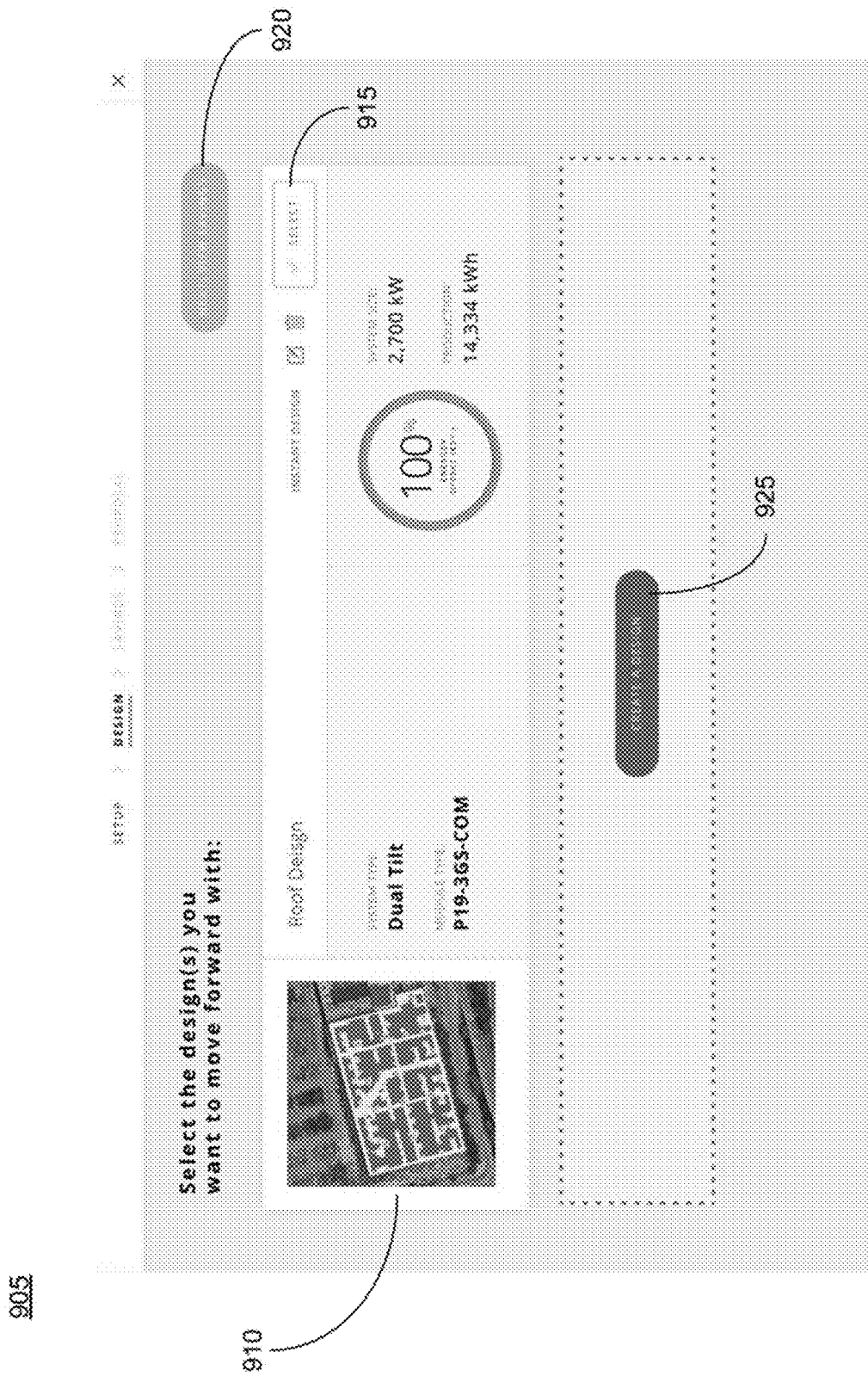
FIG. 9 illustrates an exemplary user interface for viewing the solar panel system layout design created by the user that was added to the page for selecting and/or creating designs according to one or more aspects of the disclosed subject matter.

FIG. 9 illustrates an exemplary user interface 905 for viewing the solar panel system layout design created by the user that was added to the page for selecting and/or creating designs (e.g., a project configuration page) according to one or more aspects of the disclosed subject matter. For example, the user interface 905 can be an updated version of the user interface 305. In other words, the user interface 305 did not have any designs to select so the user created a design, and the design the user created was added to the page for selecting and/or creating designs and is now available to select in the user interface 905. In the user interface 905, a solar panel system layout design 910 can be viewed by the user. Additionally, the solar panel system layout design 910 can include an image of the design, equipment information, production data, and the like as a summary of the design. In one aspect, the user can select the design 910 by selecting a button 915. After selecting a design, the user can select a button 920 to view cost savings provided by the design 910 and continue to the next step of the solar panel system proposal process. Additionally, the user can select a button 925 to create another solar panel system layout design for comparison, wherein creating another solar panel system layout design can follow similar steps as described in FIGS. 4-8 with the user selecting different design options so that they can compare another solar panel layout design with the solar panel layout design 910.

Figure 10:
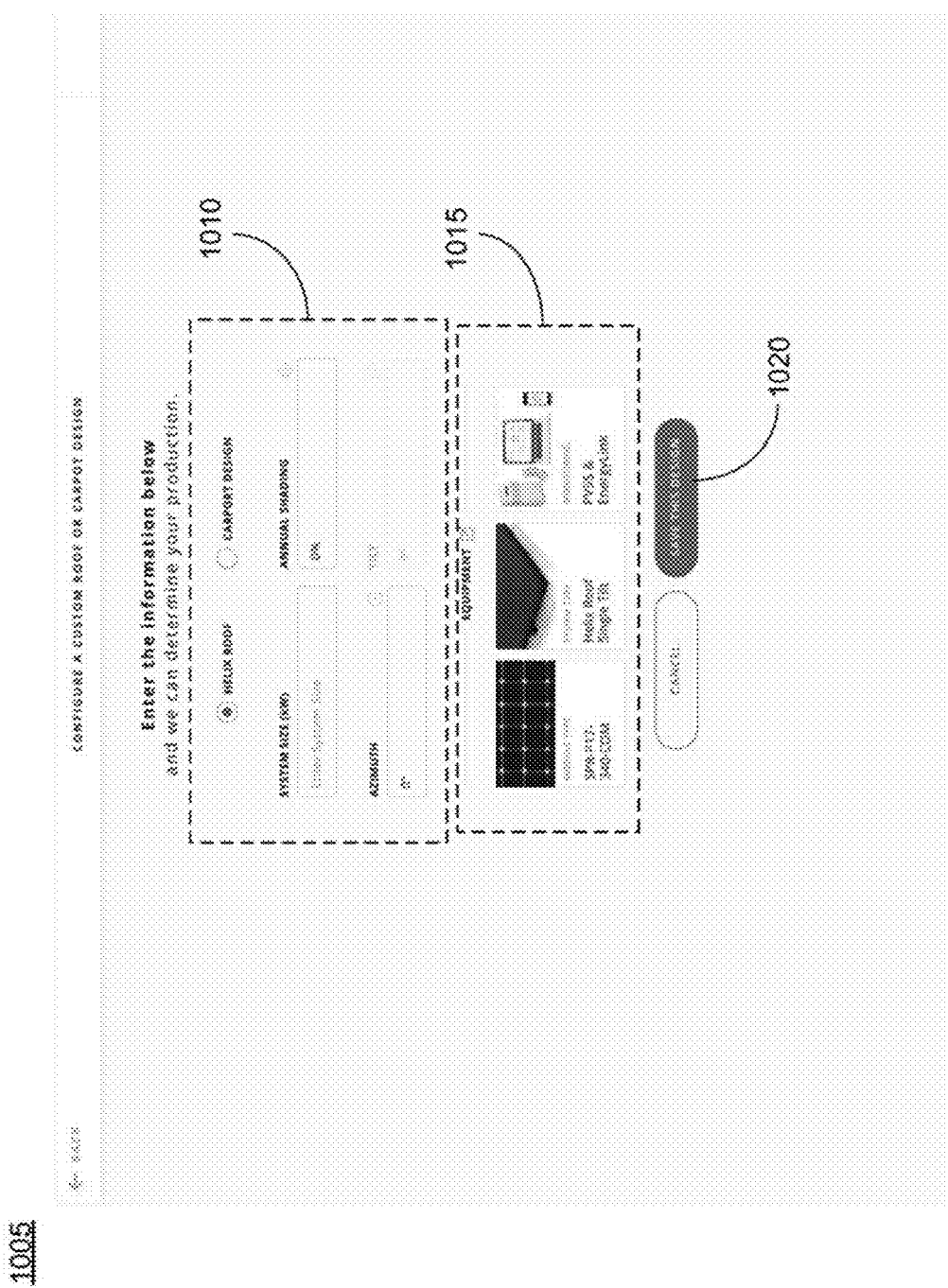
FIG. 10 illustrates an exemplary user interface for creating a custom solar panel system layout design according to one or more aspects of the disclosed subject matter.

FIG. 10 illustrates an exemplary user interface 1005 for creating a custom solar panel system layout design according to one or more aspects of the disclosed subject matter. For example, the user interface 1005 can be displayed in response to the user selecting button 415 in the user interface 405 in FIG. 4. Regarding the user interface 1005, the user can leverage a production simulation engine (e.g., solar panel system simulation 140) to view the production of a theoretical system of the user's choosing. More specifically, the user can specify inputs 1010 of a theoretical design (e.g., for a roof, carport, etc.) and define the equipment 1015 for the solar panel system. After specifying the inputs 1010 and the equipment 1015 for the solar panel system, the user can select a button 1020 to save the design, which can trigger simulation of the design's overall production (e.g., power, energy, yield, etc.). In one aspect, the simulation can be performed via the solar panel simulation 140, which can correspond to a solar panel system simulation tool.

Figure 11:
FIG. 11 illustrates an exemplary user interface for selecting a solar panel system layout design according to one or more aspects of the disclosed subject matter.

FIG. 11 illustrates an exemplary user interface 1105 for selecting a solar panel system layout design according to one or more aspects of the disclosed subject matter. For example, if the user has created more than one solar panel layout design for comparison (e.g., a first solar panel layout design 1110 and a second solar panel layout design 1115), the user can compare the production information for each design.

When the user has decided which design to move forward with, the user can select the corresponding design (e.g., by selecting a button 1120 or a button 1125), and then select a button 1130 to continue to the next step of the solar panel system proposal process and view savings information corresponding to the selected design. Additionally, the user could select a button 1135 to create another design to compare to the existing designs before continuing the solar panel system proposal process. It should be appreciated that any user interface described herein that includes a button for "Create A Design" can be configured to allow the user to create a solar panel system layout design as has been described herein.

Figure 12:
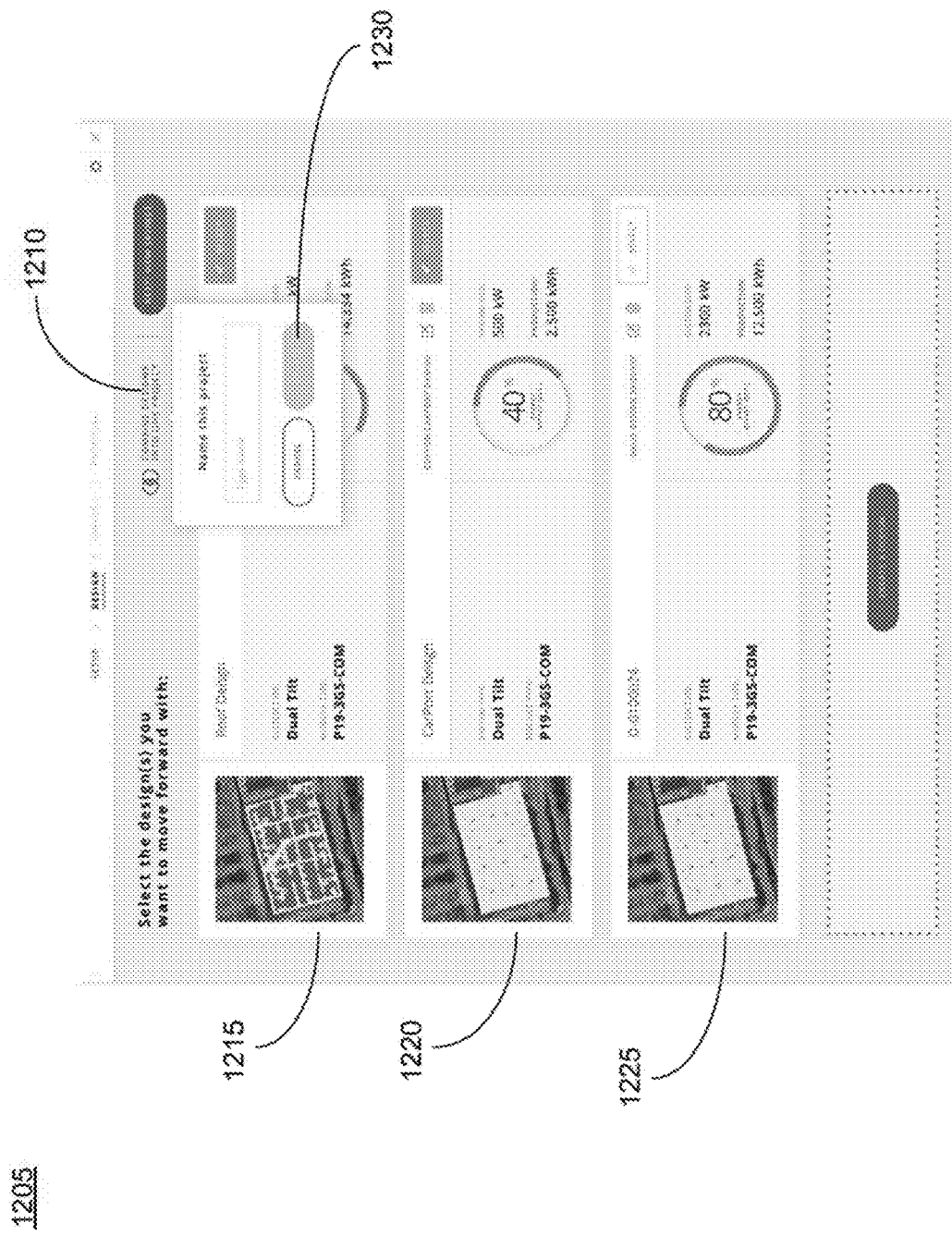
FIG. 12 illustrates an exemplary user interface for combining solar panel system layout designs according to one or more aspects of the disclosed subject matter.

FIG. 12 illustrates an exemplary user interface 1205 for combining solar panel system layout designs according to one or more aspects of the disclosed subject matter. In one aspect, the user interface 1205 can include a button 1210 to combine at least two solar panel system layout designs. For example, a first solar panel layout design 1215 and a second solar panel layout design 1220 can be selected by the user to be combined while a third solar panel layout design 1225 remains unchanged for comparison. Additionally, the user can be prompted to name the project corresponding to the combined solar panel layout designs. After naming the project, the user can select a button 1230 to create the combined solar panel layout design which can be displayed as an option for selection in a user interface 1305 in FIG. 13, for example.

Figure 13:
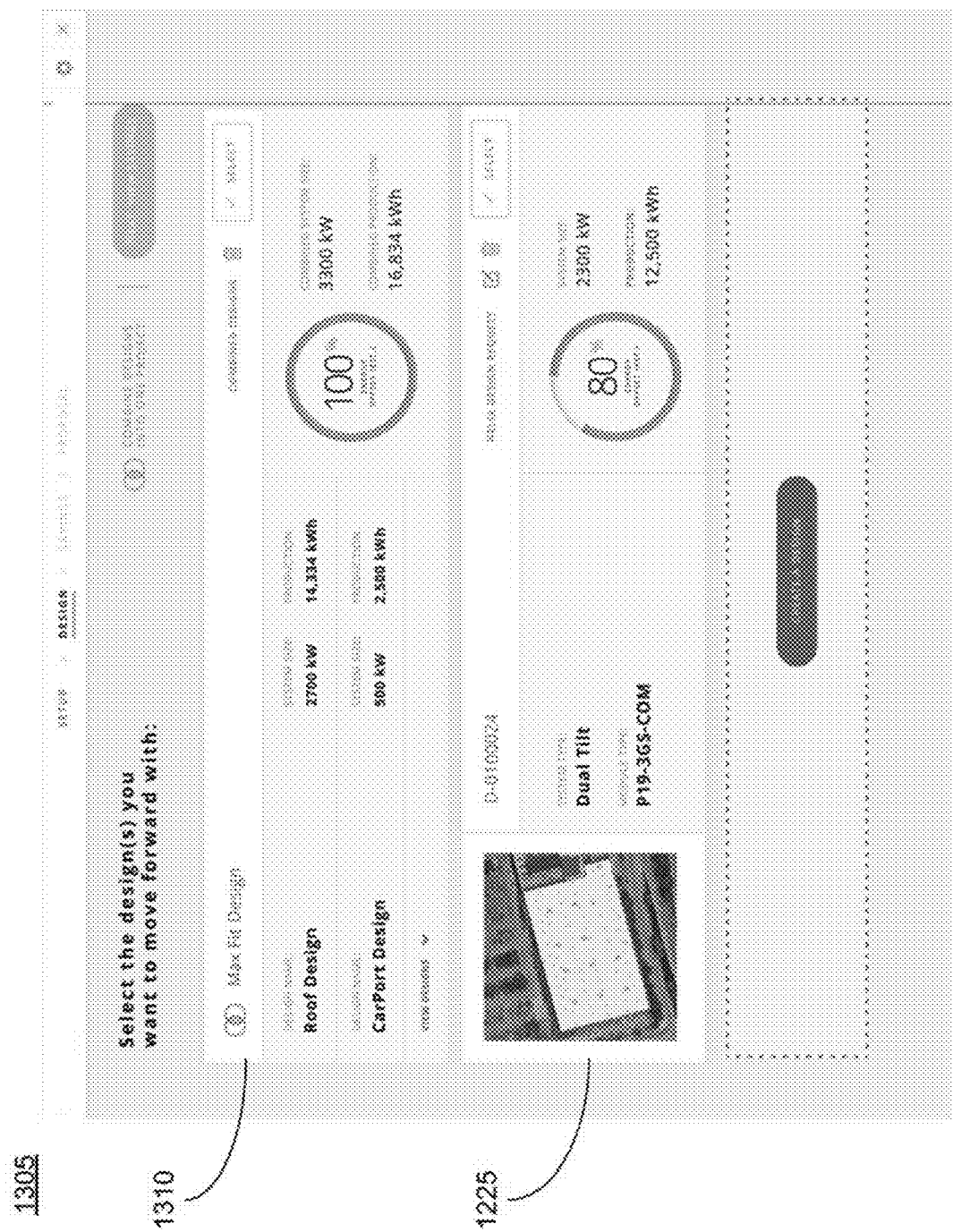
FIG. 13 illustrates an exemplary user interface for selecting a solar panel system layout design that includes a combined design according to one or more aspects of the disclosed subject matter.

FIG. 13 illustrates an exemplary user interface 1305 for selecting a solar panel system layout design that includes a combined design 1310 according to one or more aspects of the disclosed subject matter. For example, the user interface 1305 can include the combined design 1310 and an additional design option for comparison (e.g., the third design option 1225 from FIG. 12). Because the combined design 1310 combined two designs (e.g., designs 1215 and 1220), the combined design 1310 has increased the overall production of the solar panel system (e.g., in this example, the combined design has increased the production of the solar panel system to 100%).

Figure 14:
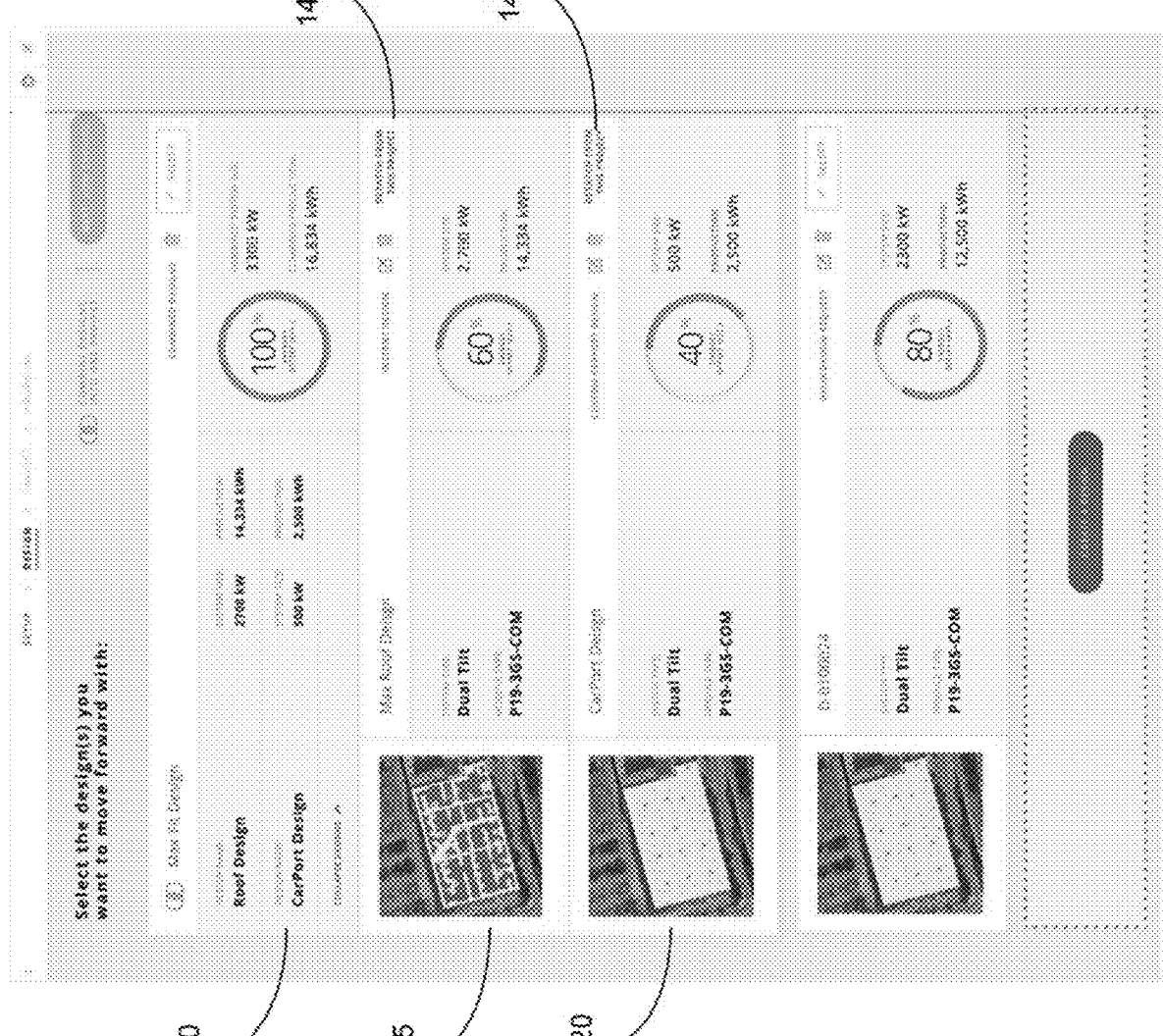
FIG. 14 illustrates an exemplary user interface for viewing the designs that make up a project (e.g., combined design) according to one or more aspects of the disclosed subject matter.

FIG. 14 illustrates an exemplary user interface 1405 for viewing the designs that make up a project (e.g., combined design) according to one or more aspects of the disclosed subject matter. For example, the user can expand a combined design 1410 to view a first and second design 1415 and 1420 that make up the combined design 1410. Additionally, the user has the option to detach one or more of the designs 1415, 1420 from the combined design 1410 by selecting a corresponding detach button 1425, 1430.

Figure 15:
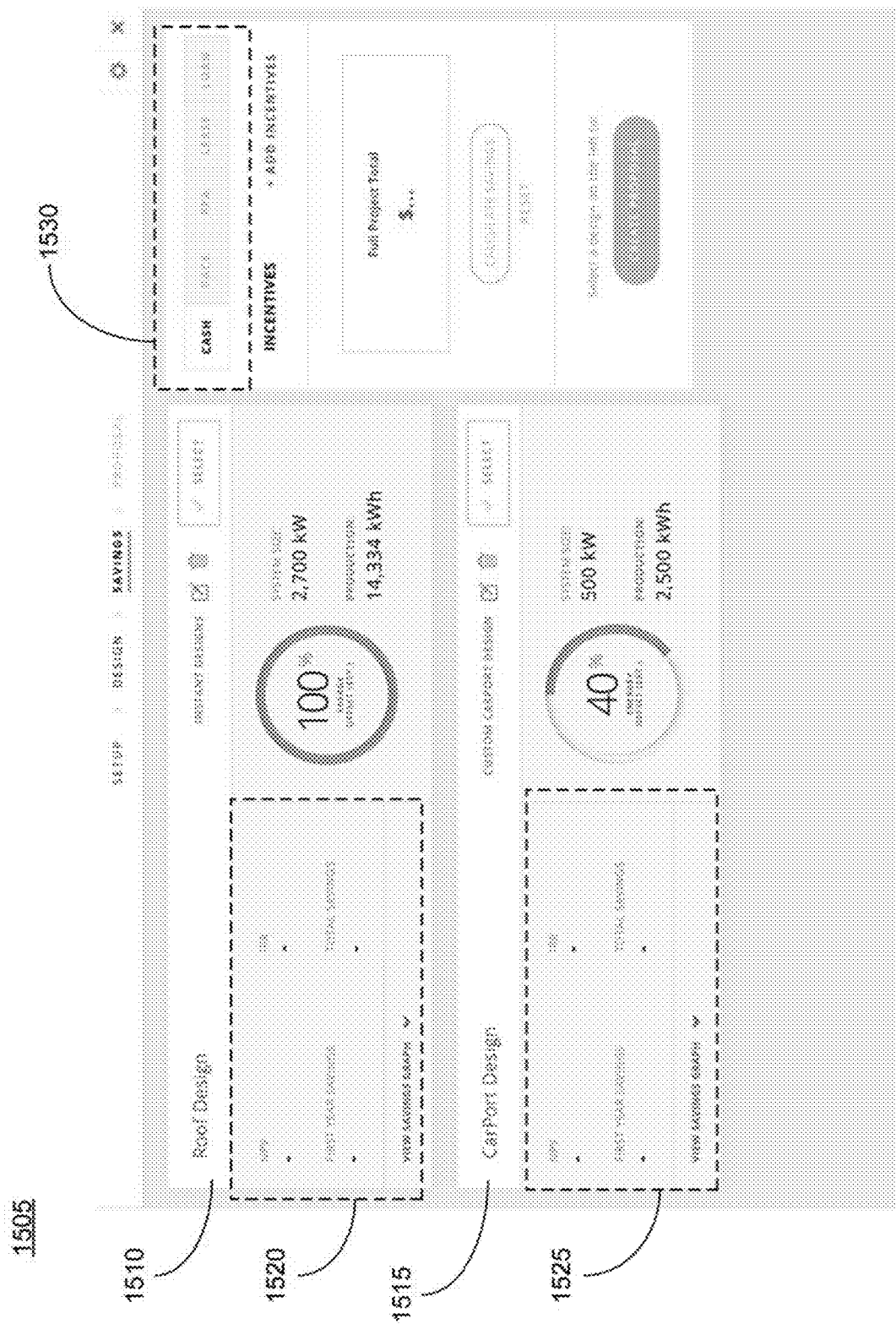
FIG. 15 illustrates an exemplary user interface for viewing savings associated with each solar panel system design option according to one or more aspects of the disclosed subject matter.

FIG. 15 illustrates an exemplary user interface 1505 for viewing savings associated with each solar panel system design option according to one or more aspects of the disclosed subject matter. For example, the user can view savings information 1510, 1515 for each design option 1520 and 1525, respectively. In one aspect, the savings information can be based on backend savings calculations (e.g., via the solar panel system savings 155). Additionally, the user can compare different financing options 1530. The financing options 1530 can include cash, property assessed clean energy (PACE), power purchase agreement (PPA), lease, and/or loan, for example. In one aspect, the remote device 110 can request financing information from the solar panel system funding 145, which can correspond to retrieving information from Sustainable Capital Finance, CleanFund, and the like.

Figure 16:
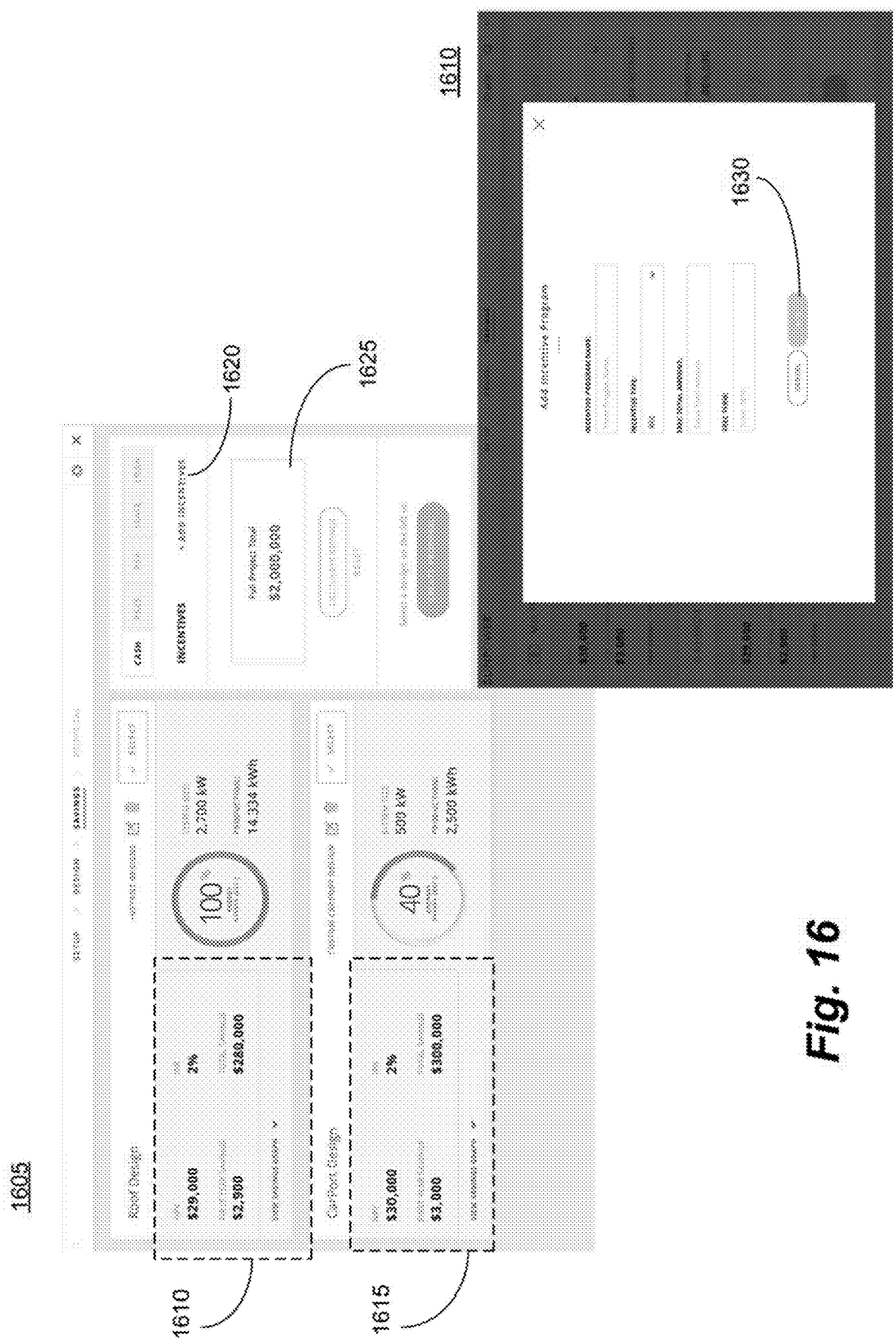
FIG. 16 illustrates a first exemplary user interface for viewing savings corresponding to a cash financing option and a second exemplary user interface for adding incentives according to one or more aspects of the disclosed subject matter.

FIG. 16 illustrates a first exemplary user interface 1605 for viewing savings corresponding to a cash financing option and a second exemplary user interface 1610 for adding incentives according to one or more aspects of the disclosed subject matter. For example, the user interface 1605 can includes savings options 1615, 1620 for each design option, respectively, based on a project total 1625 of $2,000,000, for example. Additionally, the user can select a button 1620 to add incentives, which can trigger the user interface 1610 for adding incentives. For example, the user interface 1610 can receive inputs for a name of an incentive program, an incentive type, a Solar Renewable Energy Certificate (SREC) total amount, an SREC term, and the like. Additionally, the user can select a button 1630 to add the incentive program.

Figure 17:
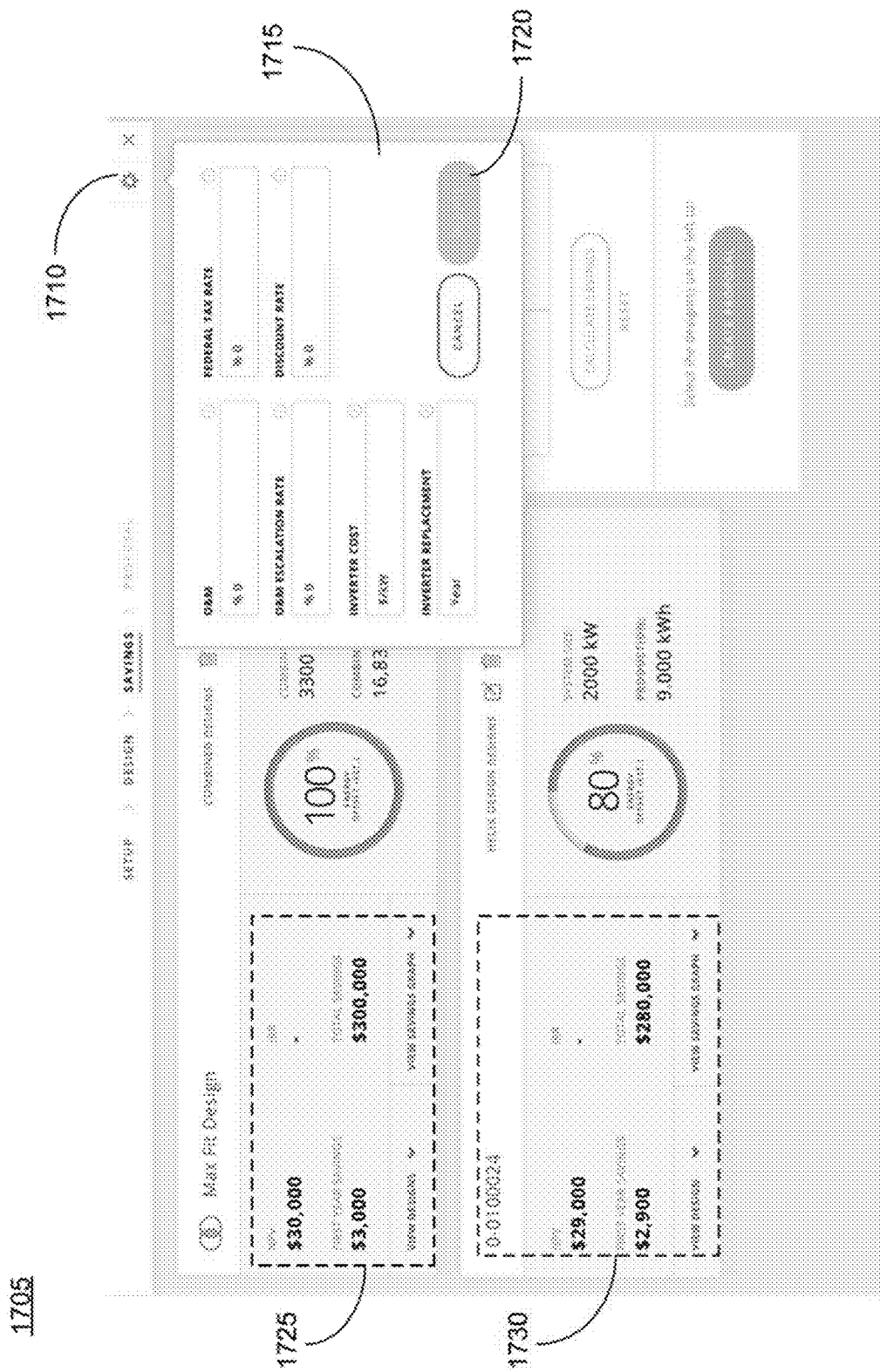
FIG. 17 illustrates an exemplary user interface for editing savings settings according to one or more aspects of the disclosed subject matter.

FIG. 17 illustrates an exemplary user interface 1705 for editing savings settings according to one or more aspects of the disclosed subject matter. For example, the user can select a modal 1710 to access saving settings 1715. The saving settings can include Operations and Maintenance (O&M), O&M Escalation Rate, Inverter Cost, Inverter Replacement, Federal Tax Rate, Discount Rate, and the like. After editing the savings settings 1715, the user can select a button 1720 to update the savings information 1725, 1730 for each design, respectively, based on the updated savings settings.

Figure 18:
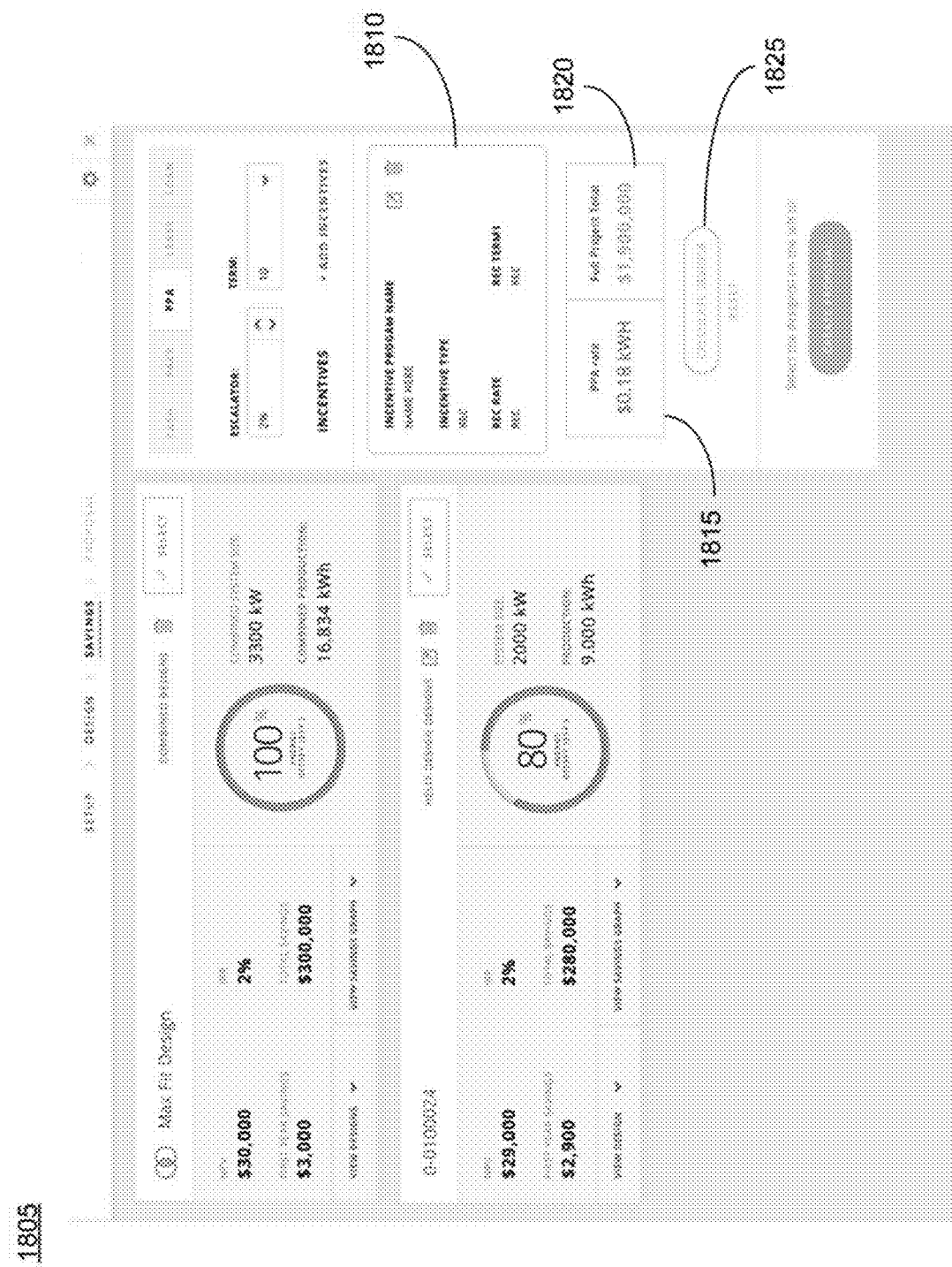
FIG. 18 illustrates an exemplary user interface for viewing savings corresponding to a Power Purchase Agreement (PPA) financing option according to one or more aspects of the disclosed subject matter.

FIG. 18 illustrates an exemplary user interface 1805 for viewing savings corresponding to a Power Purchase Agreement (PPA) financing option according to one or more aspects of the disclosed subject matter. For example, the user can configure incentives 1810, specify a target PPA rate 1815 or specify a full project cost 1820 and obtain the corresponding full project cost or the corresponding PPA rate, respectively, from the solar panel system funding 145 integration (e.g., Solar Capital Finance). Then, the user can select a button 1825 to calculate and view the savings for each design based on backend savings calculations (e.g., via the solar panel system savings 155).

Figure 19:
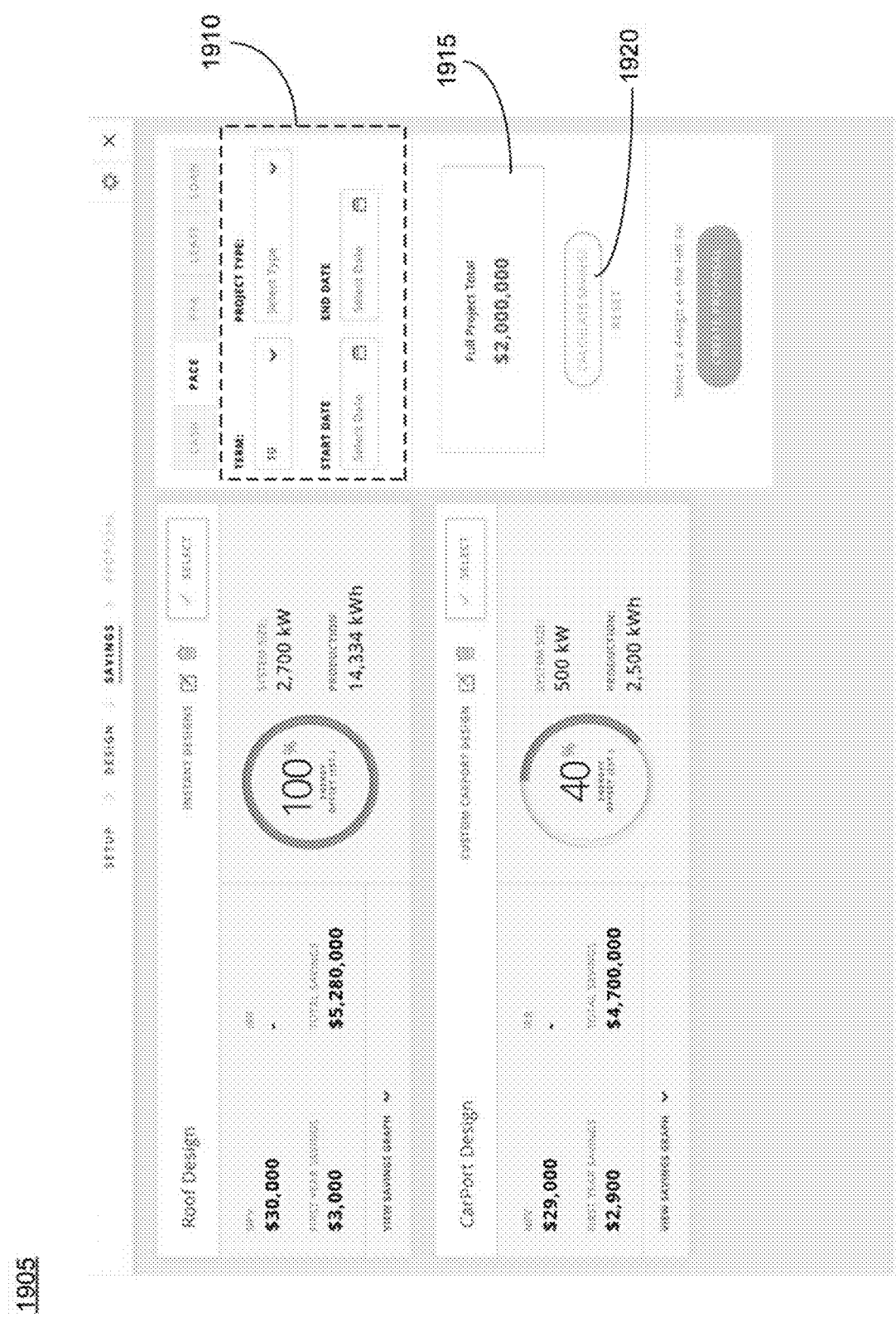
FIG. 19 illustrates an exemplary user interface for viewing savings corresponding to a Property Assessed Clean Energy (PACE) financing option according to one or more aspects of the disclosed subject matter.

FIG. 19 illustrates an exemplary user interface 1905 for viewing savings corresponding to a Property Assessed Clean Energy (PACE) financing option according to one or more aspects of the disclosed subject matter. For example, the user can specify PACE inputs 1910, configure incentives, specify a full project cost 1915, and obtain PACE payment information from the solar panel system funding 145 integration (e.g., CleanFund). Then, the user can select a button 1920 to calculate and view the savings for each design based on backend savings calculations (e.g., via the solar panel system savings 155).

Figure 20:
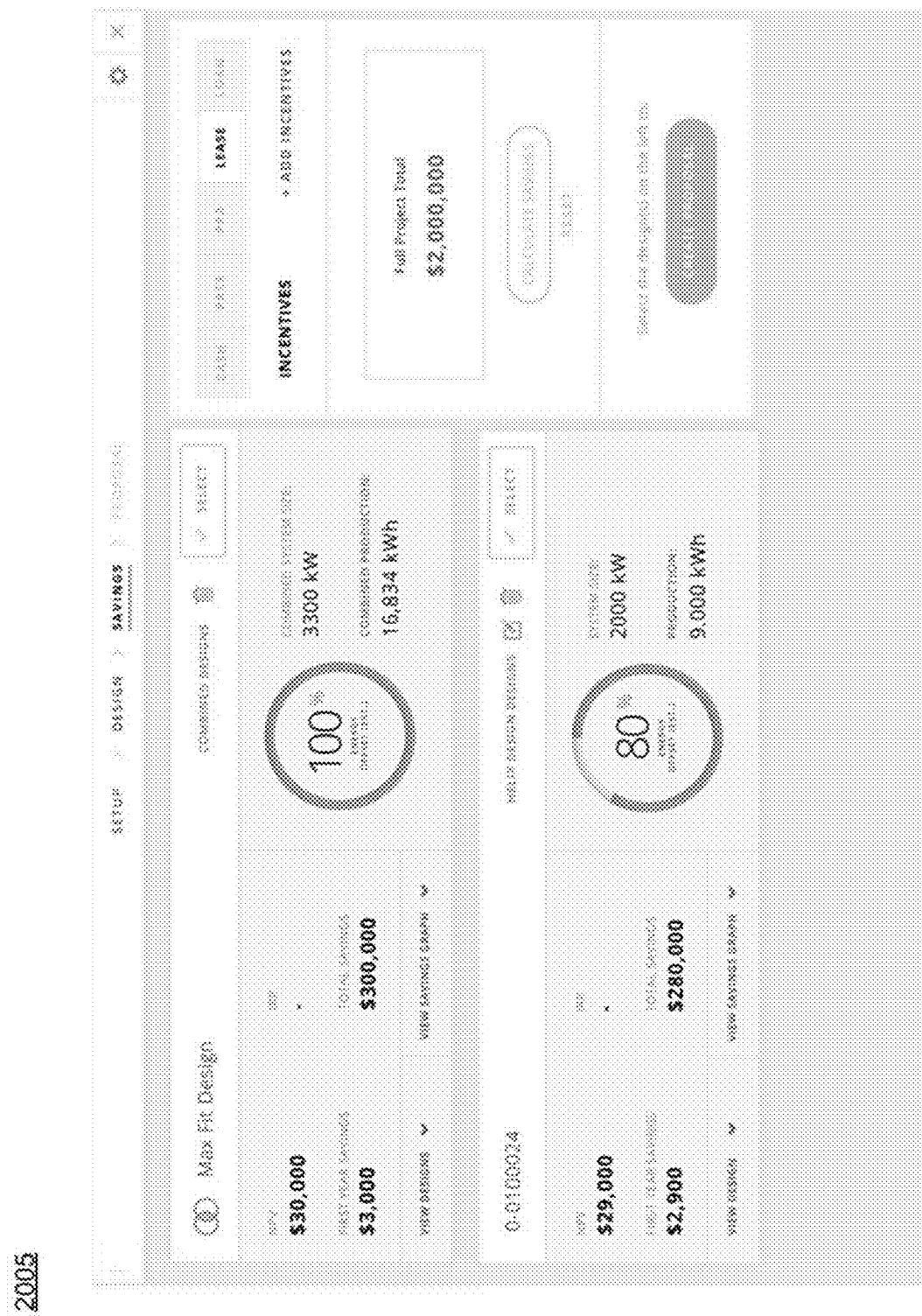
FIG. 20 illustrates an exemplary user interface for viewing savings corresponding to a lease financing option according to one or more aspects of the disclosed subject matter.

FIG. 20 illustrates an exemplary user interface 2005 for viewing savings corresponding to a lease financing option according to one or more aspects of the disclosed subject matter. For example, the user can specify lease inputs, configure incentives, specify a full project cost, and view associated savings for each design based on backend savings calculations (e.g., via the solar panel system savings 155).

Figure 21:
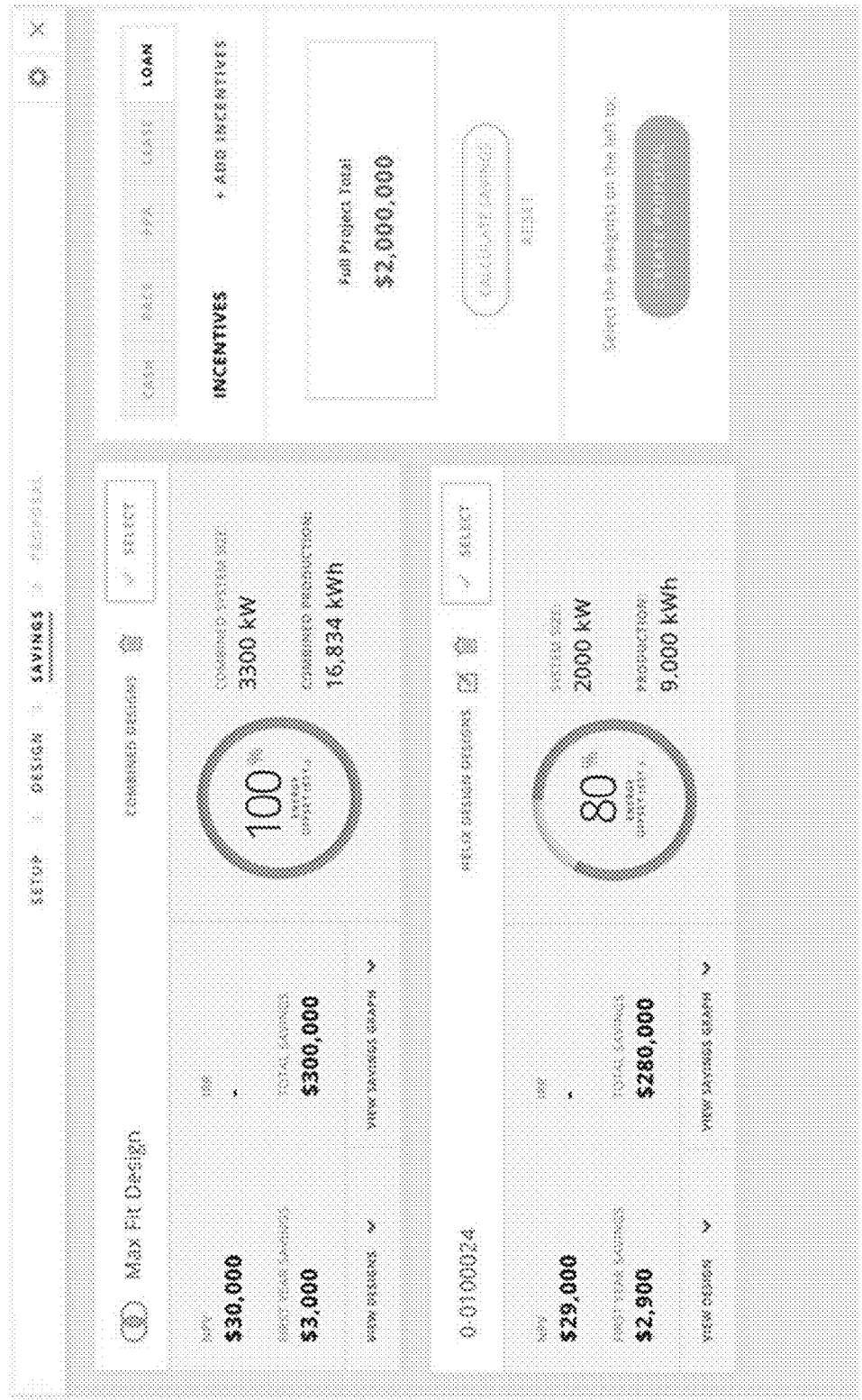
FIG. 21 illustrates an exemplary user interface for viewing savings corresponding to a loan financing option according to one or more aspects of the disclosed subject matter.

FIG. 21 illustrates an exemplary user interface 2105 for viewing savings corresponding to a loan financing option according to one or more aspects of the disclosed subject matter. For example, the user can specify loan inputs, configure incentives, specify a target PPA rate or a full project cost, obtain a corresponding full project cost or PPA rate, respectively, from the solar panel system funding 145 integration (e.g., CleanFund). Then, the user can select a button 1920 to calculate and view the savings for each design based on backend savings calculations (e.g., via the solar panel system savings 155).

Figure 22:
FIG. 22 illustrates an exemplary user interface for viewing a savings graph for a design option according to one or more aspects of the disclosed subject matter.

FIG. 22 illustrates an exemplary user interface 2205 for viewing a savings graph for a design option according to one or more aspects of the disclosed subject matter. For example, for any design, project, and financing option combination, the user can select a button 2210 to view a savings graph 2115. Accordingly, the user can view cumulative net savings for the end customer over the lifetime of the project.

Figure 23:
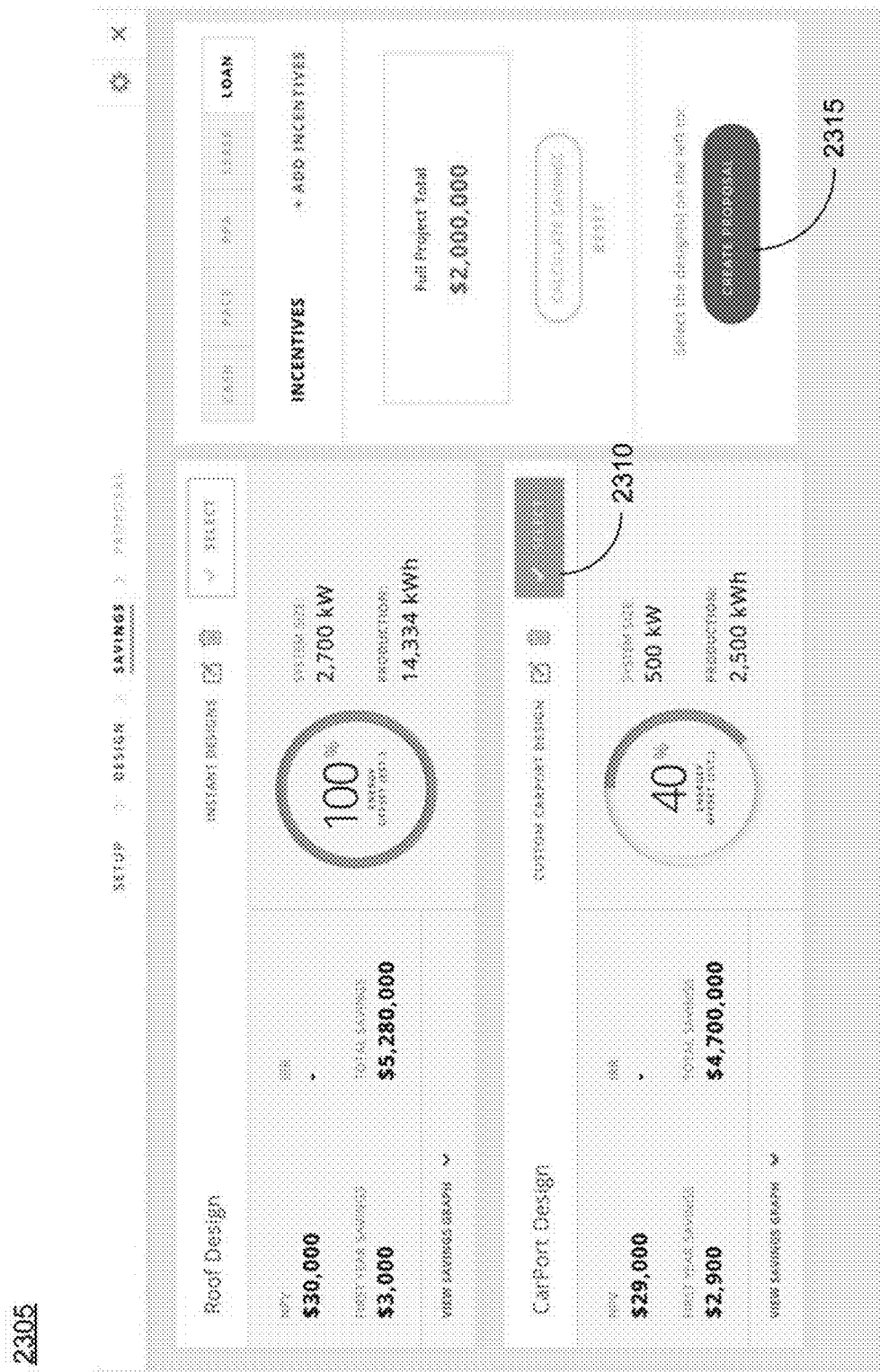
FIG. 23 illustrates an exemplary user interface for selecting the design option to create a solar panel system proposal according to one or more aspects of the disclosed subject matter.

FIG. 23 illustrates an exemplary user interface 2305 for selecting the design option to create a solar panel system proposal according to one or more aspects of the disclosed subject matter. For example, the user can select a button 2310 to select a design option. Then, the user can select a button 2315 to create the solar panel system proposal based on the selected design.

Figure 24:
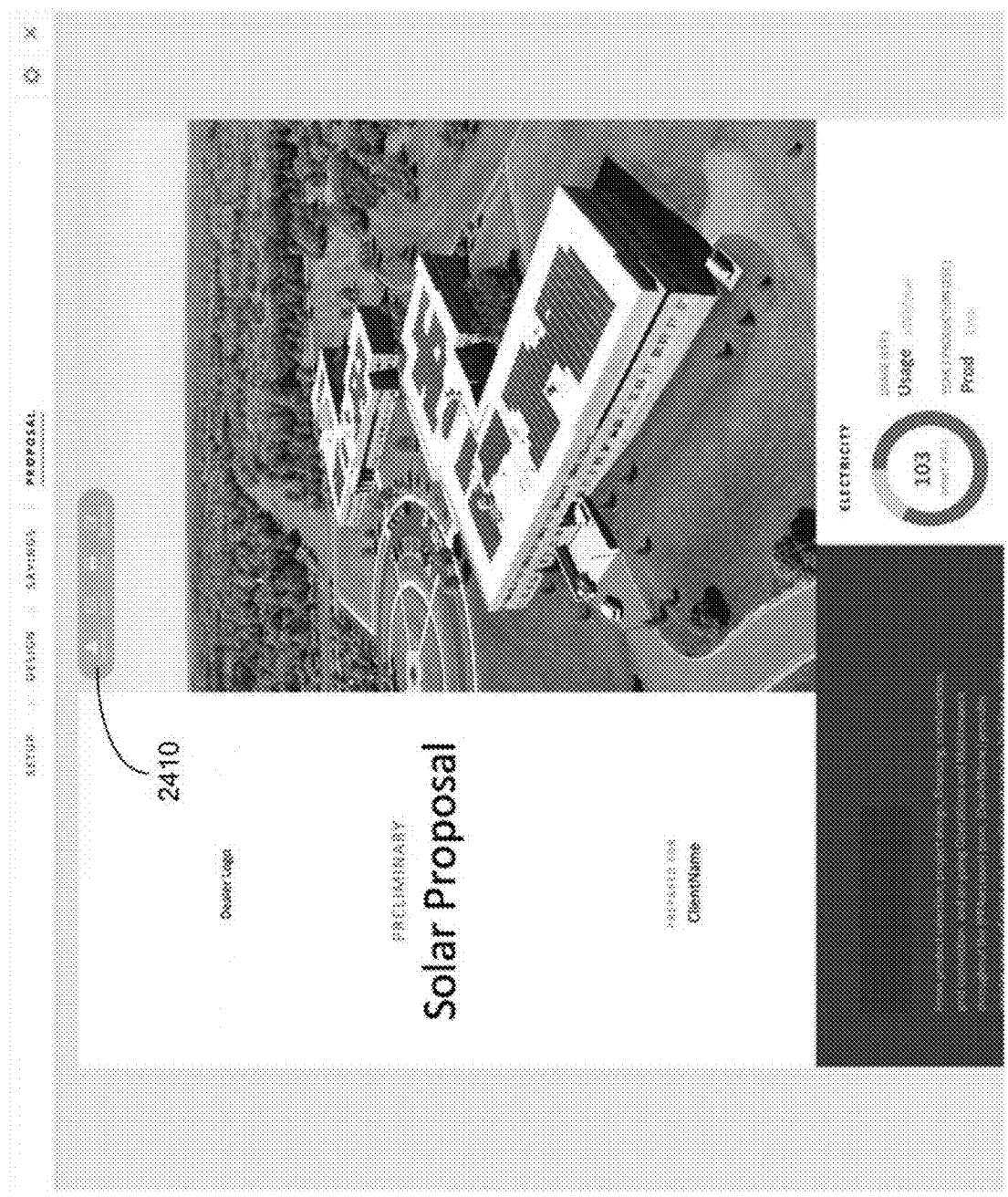
FIG. 24 illustrates an exemplary user interface for viewing an automatically generated solar panel system proposal according to one or more aspects of the disclosed subject matter.

FIG. 24 illustrates an exemplary user interface 2405 for viewing an automatically generated solar panel system proposal according to one or more aspects of the disclosed subject matter. For example, the user can select a button 2410 to download the solar panel system proposal into various document formats (e.g., via document generation 150 or locally on the remote device 110).

Figure 25:
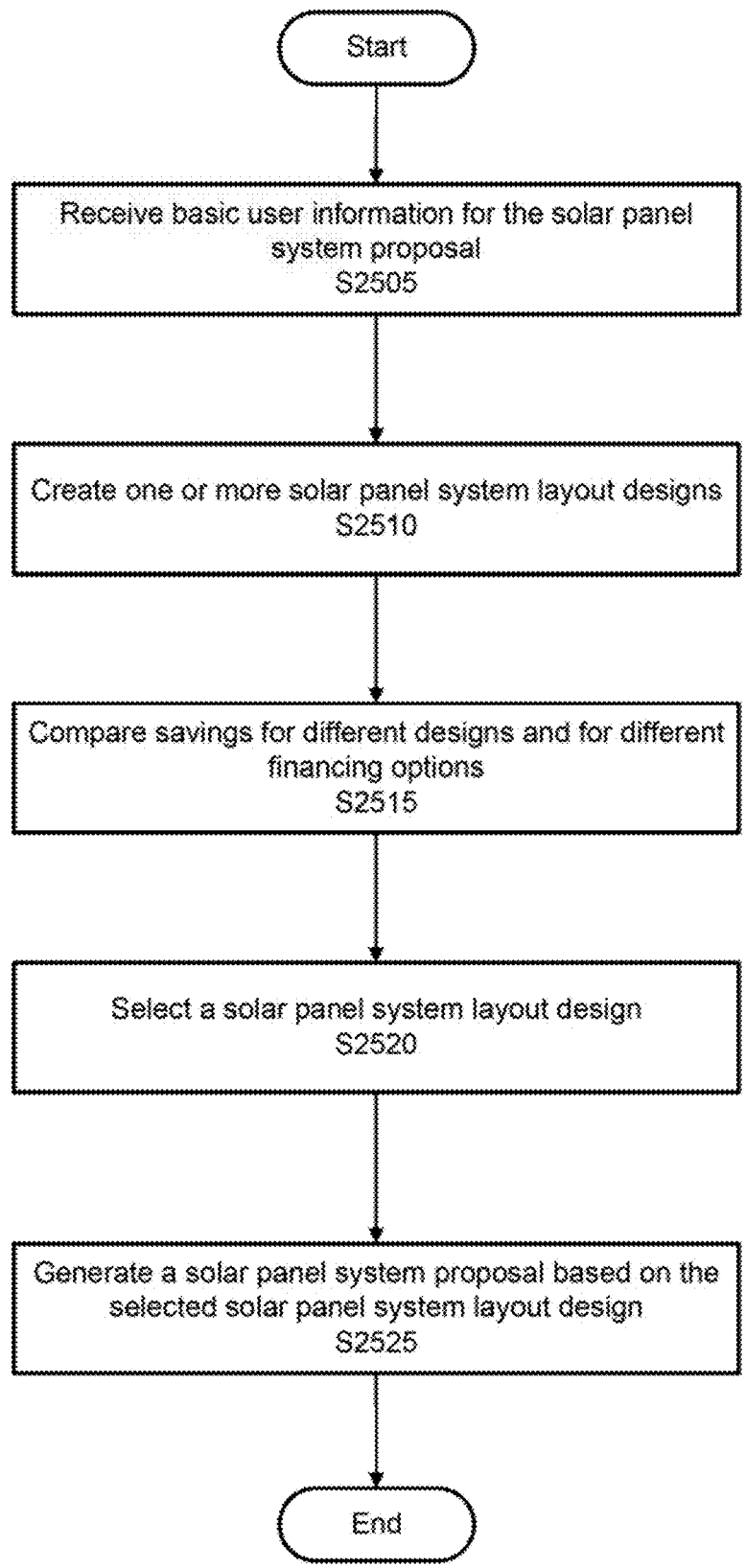
FIG. 25 is an algorithmic flow chart of a method for generating a solar panel system proposal according to one or more aspects of the disclosed subject matter.

FIG. 25 is an algorithmic flow chart of a method for generating a solar panel system proposal according to one or more aspects of the disclosed subject matter.

In S2505, the remote device 110 can be configured to receive basic user information for the solar panel system proposal. For example, the basic user information can include a name for the proposal, information about the project, the customer's electric bill, and the like.

In S2510, the system 100, via user interaction with the remote device 110, can be configured to create one or more solar panel system layout designs.

In S2515, the system 100, via user interaction with the remote device 110, can be configured to compare savings for different solar panel system layout designs and different finance options.

In S2520, the system 100, via user interaction with the remote device 110, can be configured to receive a selection a solar panel system layout design.

In S2525, the system 100, via user interaction with the remote device 110, can be configured to generate a solar panel system proposal based on the selected solar panel system layout design.

Figure 26:
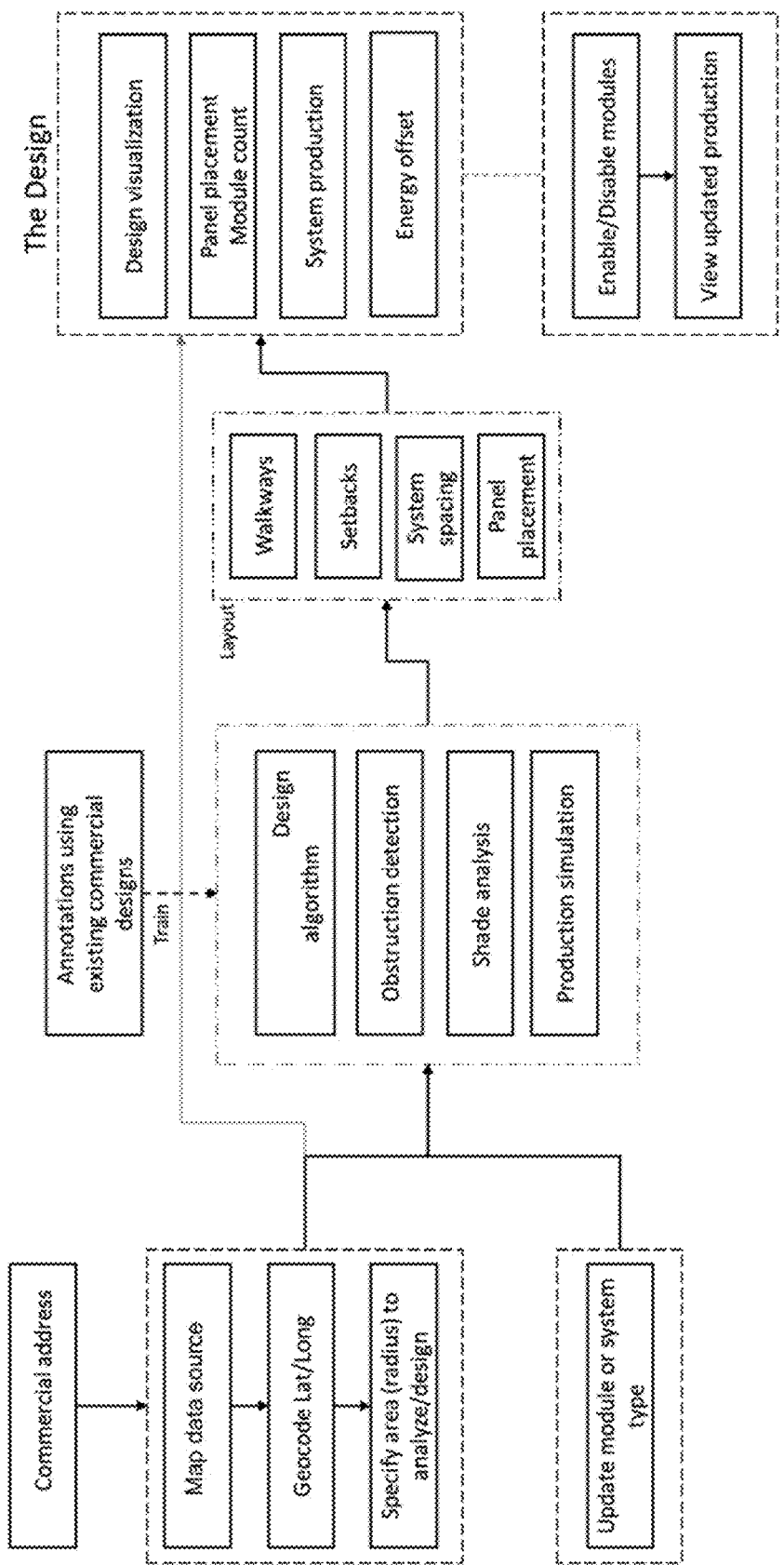
FIG. 26 illustrates an exemplary architecture for automatically creating a solar panel system layout design using a solar panel system layout design tool according to one or more aspects of the disclosed subject matter.

FIG. 26 illustrates an exemplary architecture for automatically creating a solar panel system layout design using a solar panel system layout design tool according to one or more aspects of the disclosed subject matter. For example, the solar panel system layout design tool can be SunPower's Instant Design tool which is further described in U.S. Pat. No. 10,754,999 issued on Aug. 25, 2020.

Figure 27:
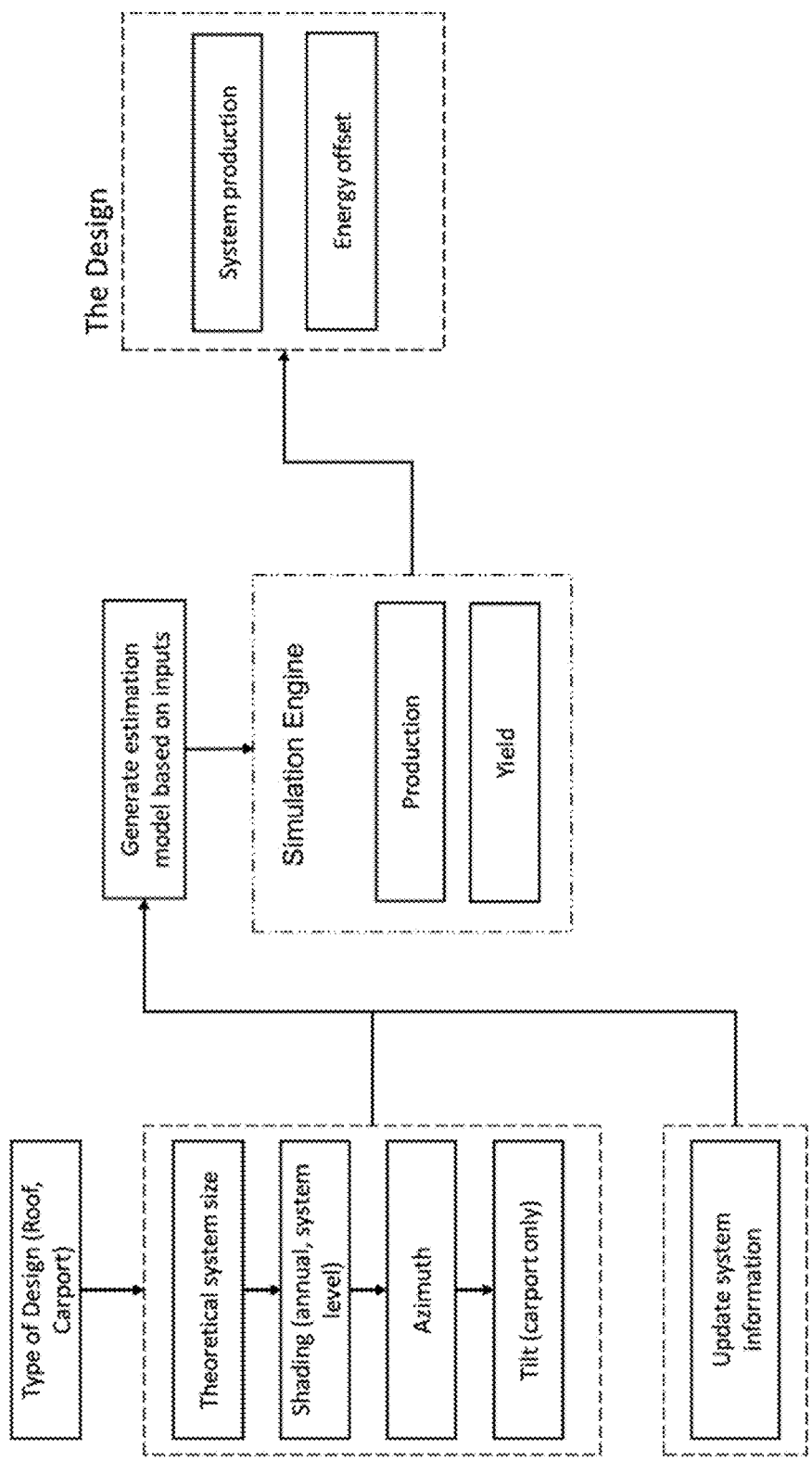
FIG. 27 illustrates an exemplary architecture for creating a custom solar panel system layout design according to one or more aspects of the disclosed subject matter.

FIG. 27 illustrates an exemplary architecture for creating a custom solar panel system layout design according to one or more aspects of the disclosed subject matter. In one aspect, the custom solar panel system layout design can leverage a production simulation engine. For example, the user can specify various system parameters (e.g., target system size, shading of the roof, the tilt and the azimuth, etc.) and the specified system parameters can be fed into the simulation engine which can output the production and yield that the system would produce based on the specified system parameters.

Figure 28:
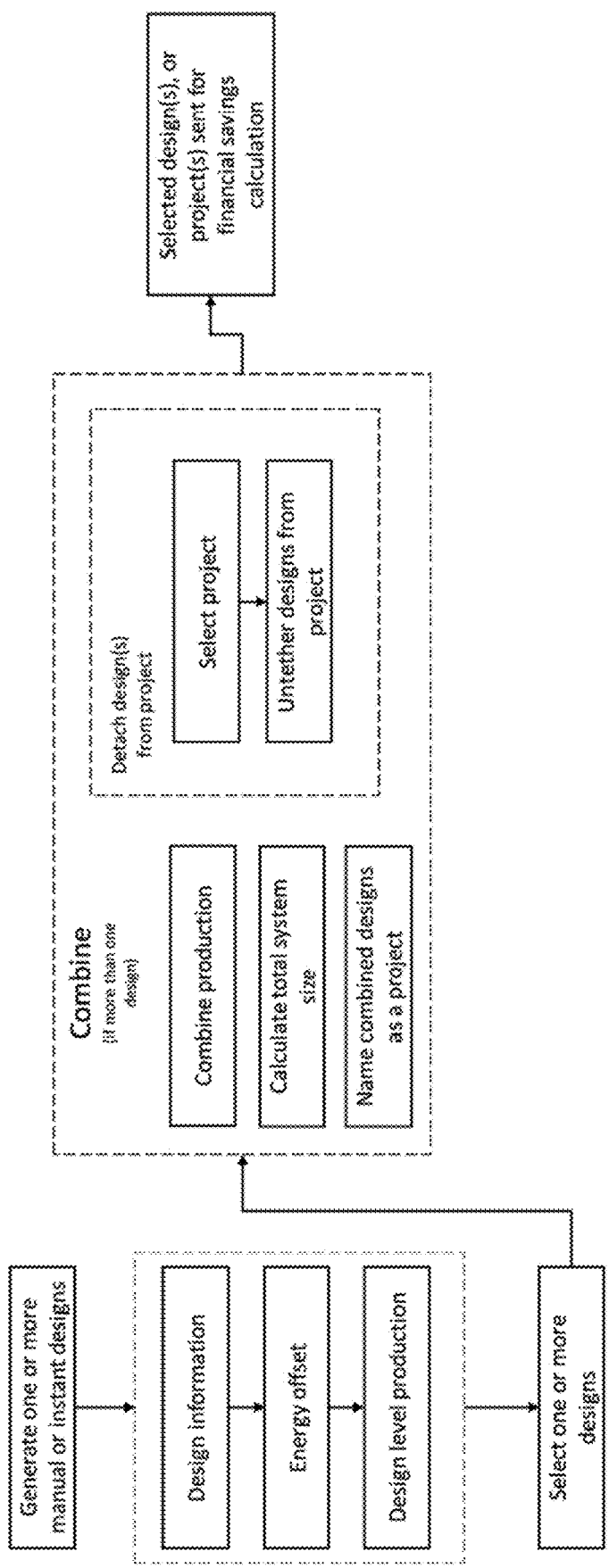
FIG. 28 illustrates an exemplary architecture for combining one or more solar panel system layout designs according to one or more aspects of the disclosed subject matter.

FIG. 28 illustrates an exemplary architecture for combining one or more solar panel system layout designs according to one or more aspects of the disclosed subject matter. In one aspects, a user can combine two or more designs into a "Project". For example, a carport design can be combined with a roof design to get their overall production and yield. This data can then used to complete a financial analysis for the project as a whole.

Figure 29:
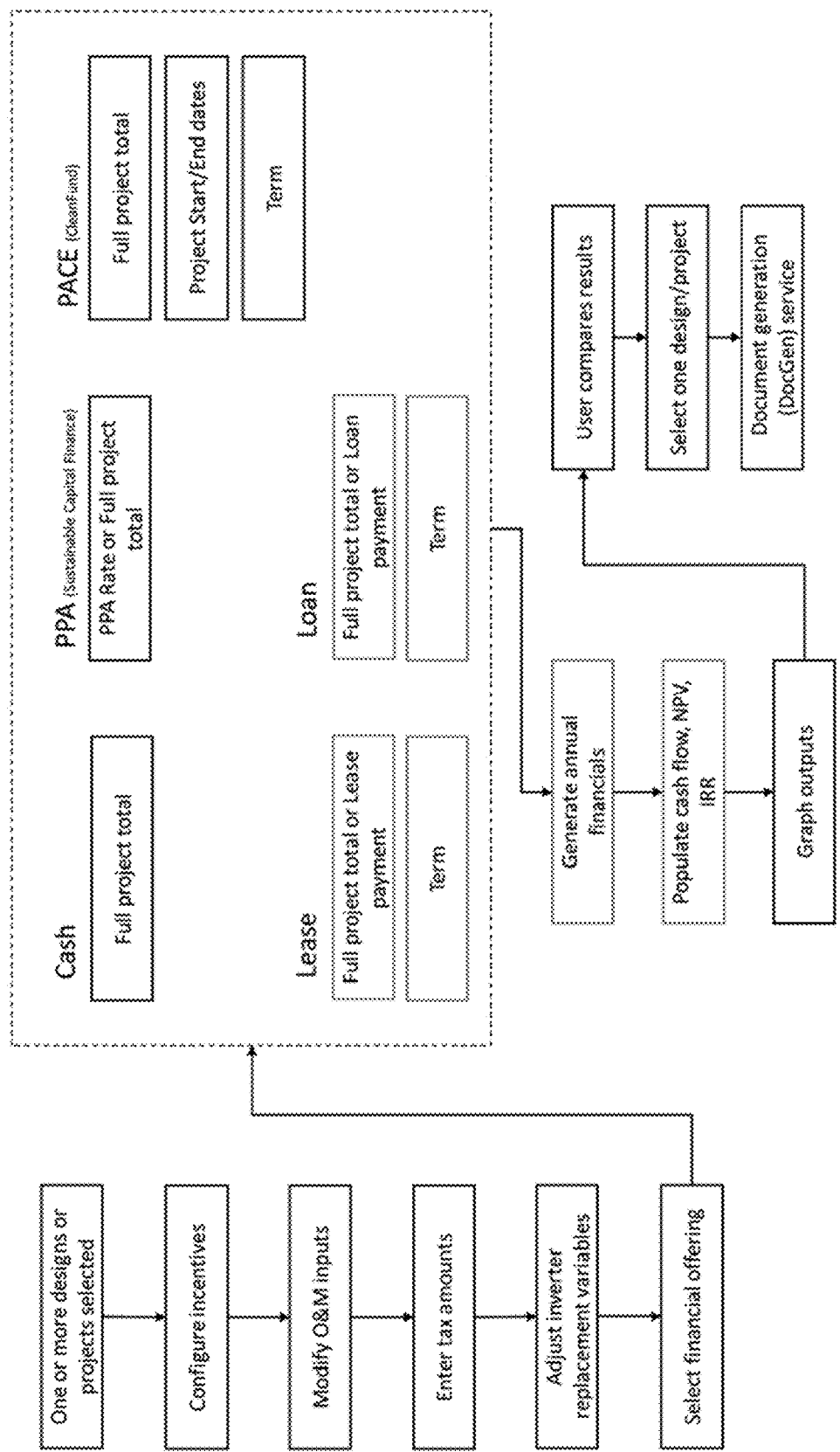
FIG. 29 illustrates an exemplary architecture for comparing financing options for different designs according to one or more aspects of the disclosed subject matter.

FIG. 29 illustrates an exemplary architecture for comparing financing options for different designs according to one or more aspects of the disclosed subject matter. In one aspect, once the user has configured their design or "project" (i.e., combination of designs) they can move on to the next step which is the financial analysis. For example, a user can define various financial parameters and can choose a financing option (e.g., Cash, PPA, PACE, Lease, Loan). Those selections can then be fed into a calculation script which generates annual financials that are then displayed (e.g., turned into graphs) and populated in the generated proposal.

In the above description of FIGS. 25-29, any processes, descriptions or blocks in flowcharts and/or architectures can be understood as representing modules, segments or portions of code which include one or more executable instructions for implementing specific logical functions or steps in the process, and alternate implementations are included within the scope of the exemplary embodiments of the present advancements in which functions can be executed out of order from that shown or discussed, including substantially concurrently or in reverse order, depending upon the functionality involved, as would be understood by those skilled in the art. The various elements, features, and processes described herein may be used independently of one another, or may be combined in various ways. All possible combinations and sub-combinations are intended to fall within the scope of this disclosure.

Figure 30:
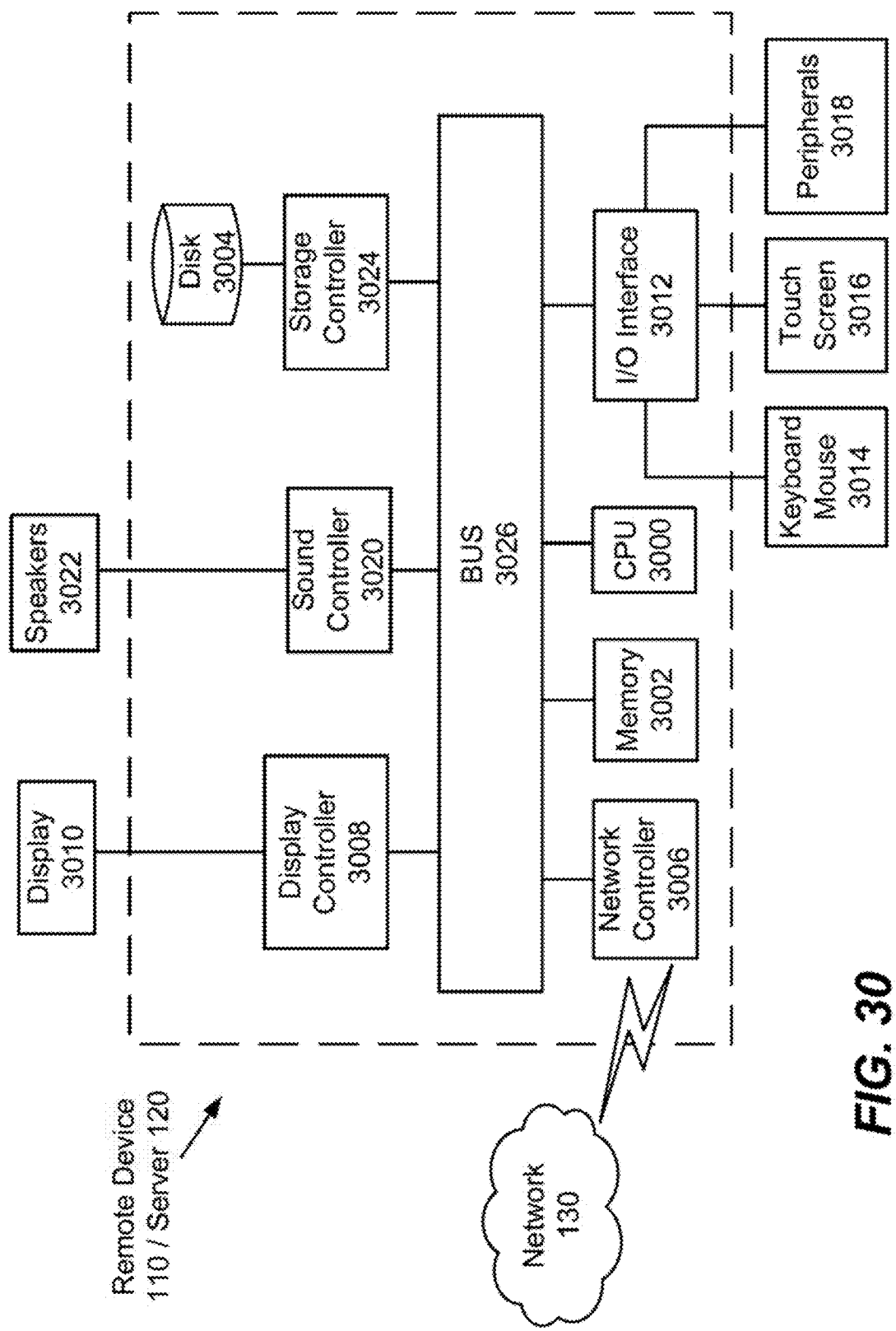
FIG. 30 is a hardware block diagram of a remote device according to one or more exemplary aspects of the disclosed subject matter.

Next, a hardware description of a computer/server/device (such as the remote device 110) according to exemplary embodiments is described with reference to FIG. 30. In one aspect, the hardware description described herein can also be a hardware description of the server 120. In FIG. 30, the remote device 110 includes a CPU 3000 which performs one or more of the processes described above/below. The process data and instructions may be stored in memory 3002. These processes and instructions may also be stored on a storage medium disk 3004 such as a hard drive (HDD) or portable storage medium or may be stored remotely. Further, the claimed advancements are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the remote device 110 communicates, such as a server or computer.

Further, the claimed advancements may be provided as a utility application, background daemon, or component of an operating system, or combination thereof, executing in conjunction with CPU 3000 and an operating system such as Microsoft Windows, UNIX, Solaris, LINUX, Apple MAC-OS and other systems known to those skilled in the art.

The hardware elements in order to achieve the remote device 110 may be realized by various circuitry elements. Further, each of the functions of the above described embodiments may be implemented by circuitry, which includes one or more processing circuits. A processing circuit includes a particularly programmed processor, for example, processor (CPU) 3000, as shown in FIG. 30. A processing circuit also includes devices such as an application specific integrated circuit (ASIC) and conventional circuit components arranged to perform the recited functions.

In FIG. 30, the remote device 110 includes a CPU 3000 which performs the processes described above. The remote device 110 may be a general-purpose computer or a particular, special-purpose machine. In one embodiment, the remote device becomes a particular, special-purpose machine when the processor 3000 is programmed to generate a solar panel system proposal (and in particular, any of the processes discussed with reference to FIGS. 25-29).

Alternatively, or additionally, the CPU 3000 may be implemented on an FPGA, ASIC, PLD or using discrete logic circuits, as one of ordinary skill in the art would recognize. Further, CPU 3000 may be implemented as multiple processors cooperatively working in parallel to perform the instructions of the inventive processes described above.

The remote device 110 in FIG. 30 also includes a network controller 3006, such as an Intel Ethernet PRO network interface card from Intel Corporation of America, for interfacing with network 130. As can be appreciated, the network 130 can be a public network, such as the Internet, or a private network such as an LAN or WAN network, or any combination thereof and can also include PSTN or ISDN subnetworks. The network 130 can also be wired, such as an Ethernet network, or can be wireless such as a cellular network including EDGE, 3G and 4G wireless cellular systems. The wireless network can also be WiFi, Bluetooth, or any other wireless form of communication that is known.

The remote device 110 further includes a display controller 3008, such as a graphics card or graphics adaptor for interfacing with display 3010, such as a monitor. A general purpose I/O interface 3012 interfaces with a keyboard and/or mouse 3014 as well as a touch screen panel 3016 on or separate from display 3010. General purpose I/O interface also connects to a variety of peripherals 3018 including printers and scanners.

A sound controller 3020 is also provided in the remote device 110 to interface with speakers/microphone 3022 thereby providing sounds and/or music.

The general-purpose storage controller 3024 connects the storage medium disk 3004 with communication bus 3026, which may be an ISA, EISA, VESA, PCI, or similar, for interconnecting all of the components of the remote device 110. A description of the general features and functionality of the display 3010, keyboard and/or mouse 3014, as well as the display controller 3008, storage controller 3024, network controller 3006, sound controller 3020, and general purpose I/O interface 3012 is omitted herein for brevity as these features are known.

The exemplary circuit elements described in the context of the present disclosure may be replaced with other elements and structured differently than the examples provided herein. Moreover, circuitry configured to perform features described herein may be implemented in multiple circuit units (e.g., chips), or the features may be combined in circuitry on a single chipset.

The functions and features described herein may also be executed by various distributed components of a system. For example, one or more processors may execute these system functions, wherein the processors are distributed across multiple components communicating in a network. The distributed components may include one or more client and server machines, which may share processing, in addition to various human interface and communication devices (e.g., display monitors, smart phones, tablets, personal digital assistants (PDAs)). The network may be a private network, such as a LAN or WAN, or may be a public network, such as the Internet. Input to the system may be received via direct user input and received remotely either in real-time or as a batch process. Additionally, some implementations may be performed on modules or hardware not identical to those described. Accordingly, other implementations are within the scope that may be claimed.

Having now described embodiments of the disclosed subject matter, it should be apparent to those skilled in the art that the foregoing is merely illustrative and not limiting, having been presented by way of example only. Thus, although particular configurations have been discussed herein, other configurations can also be employed. Numerous modifications and other embodiments (e.g., combinations, rearrangements, etc.) are enabled by the present disclosure and are within the scope of one of ordinary skill in the art and are contemplated as falling within the scope of the disclosed subject matter and any equivalents thereto. Features of the disclosed embodiments can be combined, rearranged, omitted, etc., within the scope of the invention to produce additional embodiments. Furthermore, certain features may sometimes be used to advantage without a corresponding use of other features. Accordingly, Applicant(s) intend(s) to embrace all such alternatives, modifications, equivalents, and variations that are within the spirit and scope of the disclosed subject matter.

The invention claimed is:

1. A method for a solar panel system proposal, comprising:
    receiving an image of a potential installation site;
    creating one or more solar panel system layout designs, wherein creating one or more solar panel system layout designs includes creating a custom solar panel system layout design, wherein creating the custom solar panel system layout design includes:
        receiving an input of a first shape drawn on at least a portion of the image to cover at least a roof of a building, wherein the first shape drawn to cover at least the roof of the building indicates a selection of the roof of the building for which the custom solar panel system layout design is being created;
        adjusting an estimated energy offset representing a portion of electricity usage the custom solar panel system layout design can meet for the potential installation site for a time period, wherein the estimated energy offset is adjusted in response to a click and drag of a second shape on the image; and
        automatically generating the custom solar panel system layout design based on the input;
    selecting a first solar panel system layout design from the one or more solar panel system layout designs, wherein the first solar panel system layout design is associated with the custom solar panel system layout design;
    selecting a second solar panel system layout design from the one or more solar panel system layout designs;
    generating a third solar panel system layout design by combining the first solar panel system layout design with the second solar panel system layout design;
    in response to a user interaction, expanding the third solar panel system layout design to display the first solar panel system layout design and the second solar panel system layout design; and
    generating a solar panel system proposal based on the third solar panel system layout design.

2. The method of claim 1, further comprising:
    comparing savings for different solar panel system layout designs.

3. The method of claim 1, further comprising:
    combining two solar panel system layout designs.

4. The method of claim 2, wherein comparing savings for different solar panel system layout designs further comprises:
    comparing a plurality of finance options.

5. The method of claim 1, wherein creating the custom solar panel system layout design includes
    receiving one or more specified system parameters;
    feeding the one or more specified system parameters into a simulation engine; and
    receiving, as output from the simulation engine, a production and yield that a solar panel system layout design would produce based on the one or more specified system parameters.

6. The method of claim 3, wherein combining two solar panel system layout designs includes
    receiving an overall production and yield of the combined solar panel system layout designs.

7. The method of claim 6, wherein combining two solar panel system layout designs further includes
    generating a financial analysis for the combined solar panel system layout designs.

8. The method of claim 4, wherein comparing a plurality of finance options includes
    receiving various financial parameters;
    receiving a financing option;
    generating annual financials based on the received financial parameters and the financing option; and
    displaying the generated annual financials as part of the solar panel system proposal.

9. The method of claim 1, further comprising:
    displaying a first solar panel layout design and a second solar panel layout design of the one or more solar panel system layout designs, wherein each of the first solar panel layout design and the second solar panel layout design include production information for the respective solar panel layout design; and
    receiving an instruction to combine the first solar panel layout design and the second solar panel layout design, wherein combining the first solar panel layout design and the second solar panel layout design includes combining the production information for each of the solar panel layout designs.

10. The method of claim 1, further comprising displaying savings options for each of the first, the second, and the third solar panel system layout designs.

11. An electronic device, comprising:
    circuitry configured to:
        receive an image of a potential installation site;
        create one or more solar panel system layout designs, wherein the circuitry for creating one or more solar panel system layout designs is further configured to create a custom solar panel system layout design;
        wherein the circuitry for creating the custom solar panel system layout design is further configured to:
            receive an input of a first shape drawn on at least a portion of the image to cover at least a roof of a building, wherein the first shape drawn to cover at least the roof of the building indicates a selection of the roof of the building for which the custom solar panel system layout design is being created;
            adjust an estimated energy offset representing a portion of electricity usage the custom solar panel system layout design can meet for the potential installation site for a time period, wherein the estimated energy offset is adjusted in response to a click and drag of a second shape on the image; and
            automatically generate the custom solar panel system layout design based on the input;
        select a first solar panel system layout design from the one or more solar panel system layout designs, wherein the first solar panel system layout design is associated with the custom solar panel system layout design;
        select a second solar panel system layout design from the one or more solar panel system layout designs;
        generate a third solar panel system layout design by combining the first solar panel system layout design with the second solar panel system layout design;
        in response to a user interaction, expand the third solar panel system layout design to display the first solar panel system layout design and the second solar panel system layout design; and
        generate a solar panel system proposal based on the third solar panel system layout design.

12. The electronic device of claim 11, wherein the circuitry is further configured to
    compare savings for different solar panel system layout designs.

13. The electronic device of claim 11, wherein the circuitry is further configured to
    combine two solar panel system layout designs.

14. The electronic device of claim 12, wherein the circuitry for comparing savings for different solar panel system layout designs is further configured to
    compare a plurality of finance options.

15. The electronic device of claim 11, wherein the circuitry for creating a custom solar panel system layout design is further configured to
    receive one or more specified system parameters,
    feed the one or more specified system parameters into a simulation engine, and
    receive, as output from the simulation engine, a production and yield that a solar panel system layout design would produce based on the one or more specified system parameters.

16. The electronic device of claim 13, wherein the circuitry for combining two solar panel system layout designs is further configured to
    receive an overall production and yield of the combined solar panel system layout designs, and
    generate a financial analysis for the combined solar panel system layout designs.

17. The electronic device of claim 14, wherein the circuitry for comparing a plurality of finance options is further configured to
    receive various financial parameters,
    receive a financing option,
    generate annual financials based on the received financial parameters and the financing option, and
    display the generated annual financials as part of the solar panel system proposal.

18. The electronic device of claim 11, wherein the circuitry for creating the custom solar panel system layout design is further configured to:
    display a first solar panel layout design and a second solar panel layout design of the one or more solar panel system layout designs, wherein each of the first solar panel layout design and the second solar panel layout design include production information for the respective solar panel layout design; and
    receive an instruction to combine the first solar panel layout design and the second solar panel layout design, wherein combining the first solar panel layout design and the second solar panel layout design includes combining the production information for each of the solar panel layout designs.

19. The electronic device of claim 11, wherein the circuitry for creating the custom solar panel system layout design is further configured to display savings options for each of the first, the second, and the third solar panel system layout designs.

20. One or more non-transitory computer readable medium media including computer program instructions, which when executed by an information processing system, cause the system to:

receive an image of a potential installation site;

create one or more solar panel system layout designs, wherein creating one or more solar panel system layout designs causes the system to create a custom solar panel system layout design, wherein creating the custom solar panel system layout design further causes the system to:

receive an input of a first shape drawn on at least a portion of the image to cover at least a roof of a building, wherein the first shape drawn to cover at least the roof of the building indicates a selection of the roof of the building for which the custom solar panel system layout design is being created;

adjust an estimated energy offset representing a portion of electricity usage the custom solar panel system layout design can meet for the potential installation site for a time period, wherein the estimated energy offset is adjusted in response to a click and drag of a second shape on the image; and automatically generate the custom solar panel system layout design based on the input;

select a first solar panel system layout design from the one or more solar panel system layout designs, wherein the first solar panel system layout design is associated with the custom solar panel system layout design;

select a second solar panel system layout design from the one or more solar panel system layout designs;

generate a third solar panel system layout design by combining the first solar panel system layout design with the second solar panel system layout design;

in response to a user interaction, expand the third solar panel system layout design to display the first solar panel system layout design and the second solar panel system layout design; and generate a solar panel system proposal based on the third solar panel system layout design.

\* \* \* \* \*